(12) United States Patent
Tims et al.

(10) Patent No.: US 12,021,425 B2
(45) Date of Patent: Jun. 25, 2024

(54) LEAD FRAME FOR AN ELECTRIC MOTOR OR GENERATOR

(71) Applicant: Protean Electric Limited, Surrey (GB)

(72) Inventors: Chris Tims, Surrey (GB); Neil Vanstone-Reed, Surrey (GB); Samuel Broadbridge, Surrey (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 651 days.

(21) Appl. No.: 17/255,052

(22) PCT Filed: May 21, 2019

(86) PCT No.: PCT/IB2019/054195
§ 371 (c)(1),
(2) Date: Dec. 22, 2020

(87) PCT Pub. No.: WO2019/224723
PCT Pub. Date: Nov. 28, 2019

(65) Prior Publication Data
US 2021/0135527 A1    May 6, 2021

(30) Foreign Application Priority Data
May 22, 2018   (GB) .................................. 1808390.7

(51) Int. Cl.
*H02K 3/26*    (2006.01)
*H02K 3/28*    (2006.01)
(Continued)

(52) U.S. Cl.
CPC .................. *H02K 3/26* (2013.01); *H02K 3/28* (2013.01); *H02K 3/522* (2013.01); *H02K 1/145* (2013.01);
(Continued)

(58) Field of Classification Search
CPC ............ H02K 3/26; H02K 3/28; H02K 3/522; H02K 1/145; H02K 2203/03;
(Continued)

(56) References Cited

U.S. PATENT DOCUMENTS 9,835,476 B2 * 12/2017 Rosenegger ......... G01D 11/245
2015/0145358 A1 * 5/2015 Cho ....................... H02K 3/522
310/71

FOREIGN PATENT DOCUMENTS

EP          2337210 A1 *  6/2011  ............ B60L 15/007

* cited by examiner

*Primary Examiner* — Tulsidas C Patel
*Assistant Examiner* — Mohammed Ahmed Qureshi
(74) *Attorney, Agent, or Firm* — ALLEN, DYER ET AL.

(57) ABSTRACT

A lead frame for electrically coupling a plurality of inverter legs of an inverter to a set of coil windings of an electric motor or generator, the lead frame comprising a printed circuit board having a plurality of circuit board layers. Each circuit board layer includes an insulating substrate having an electrically conductive layer formed on the insulating substrate. First, second and third circuit board layers each include a respective electrically conductive layer arranged to be coupled to a corresponding coil winding of the first set of coil windings and a respective inverter leg. A fourth circuit board layer includes a respective electrically conductive layer arranged to be coupled to all of the third coil windings to form a neutral point therebetween.

13 Claims, 18 Drawing Sheets

(51) Int. Cl.
*H02K 3/52* (2006.01)
*H02K 1/14* (2006.01)

(52) U.S. Cl.
CPC ..... *H02K 2203/03* (2013.01); *H02K 2203/09* (2013.01)

(58) Field of Classification Search
CPC .... H02K 2203/09; H02K 7/006; H02K 11/33; Y02E 10/72
See application file for complete search history.

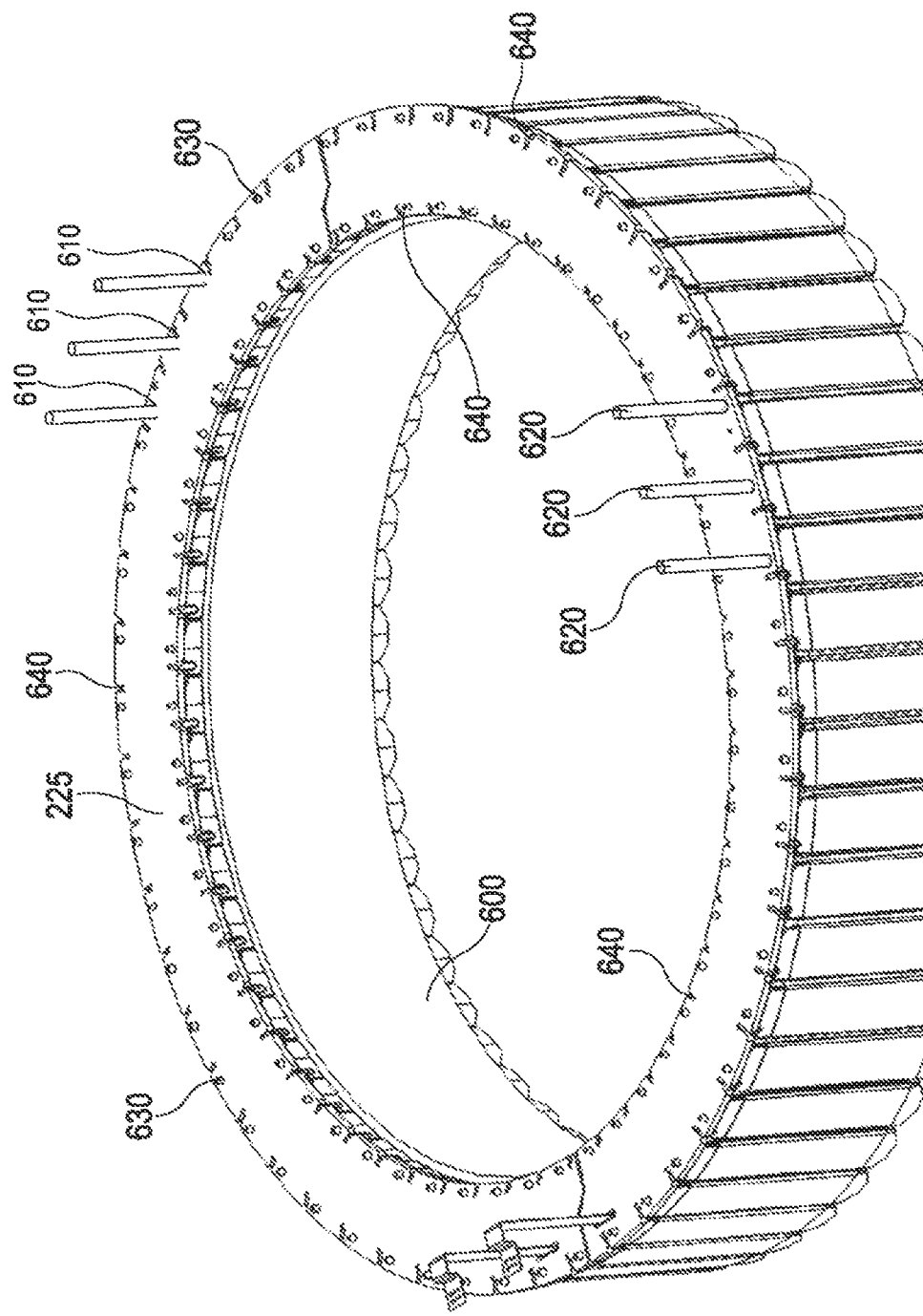

LEAD FRAME FOR AN ELECTRIC MOTOR OR GENERATOR

CROSS-REFERENCE TO RELATED APPLICATIONS

This application is the § 371 National Stage of International Application Serial No. PCT/IB2019/054195, filed on May 21, 2019, which claims the benefit of U.K. Patent Application Ser. No. 1808390.7, filed on May 22, 2018, the contents of which applications are herein incorporated by reference in their entirety.

FIELD OF THE INVENTION

The present invention relates to a lead frame, in particular a lead frame for forming a plurality of sub motors.

BACKGROUND OF THE INVENTION

With increased interest being placed in environmentally friendly vehicles there has been a corresponding increase in interest in the use of electric motors for providing drive torque for vehicles.

Electric motor systems typically include an electric motor, with a control unit arranged to control the power of the electric motor. Examples of known types of electric motor include the induction motor, synchronous brushless permanent magnet motor, switched reluctance motor and linear motor. Due to the high torque demands required for driving a vehicle, the most common kind of electric motor used for this use is a three phase electric motor.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

By way of illustration, FIG. 1 shows a typical three phase electric motor 10 having three coil sets 14, 16, 18. Each coil set consists of four coil sub-sets that are connected in series, where for a given coil set the magnetic field generated by the respective coil sub-sets will have a common phase.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

A three phase bridge inverter includes a number of switching devices, for example power electronic switches such as Insulated Gate Bipolar Transistor (IGBT) switches, which are used to generate an alternating voltage from a DC voltage supply.

In the context of an electric vehicle motor, a drive design that is becoming increasing popular is an integrated in-wheel electric motor design in which an electric motor and its associated control system are integrated within a wheel of a vehicle.

However, due to space constraints within a wheel of a vehicle for the integration of an electric motor, and its associated control system, this can have an impact on the power generating capabilities of the electric motor. It is desirable to improve this situation.

SUMMARY OF THE INVENTION

In accordance with an aspect of the present invention there is provided a lead frame according to the accompanying claims. The present invention provides the advantage of allowing a lead frame to provide high current flow between an inverter and coil windings of an electric motor or generator, for generating large torque and power values, while allowing the space envelope for the electric motor/generator and inverter to be reduced.

BRIEF DESCRIPTION OF THE DRAWINGS

The present invention will now be described, by way of example, with reference to the accompanying drawings, in which:

FIG. 6 illustrates a lead frame arrangement according to an embodiment of the present invention;

DETAILED DESCRIPTION OF PREFERRED EMBODIMENTS

The embodiment of the invention described is for a lead frame for coupling an inverter, for an electric motor or generator, to a DC power supply, where preferably the electric motor is for use in a wheel of a vehicle. However if the electric motor is located within a vehicle it may be located anywhere within the vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 1:
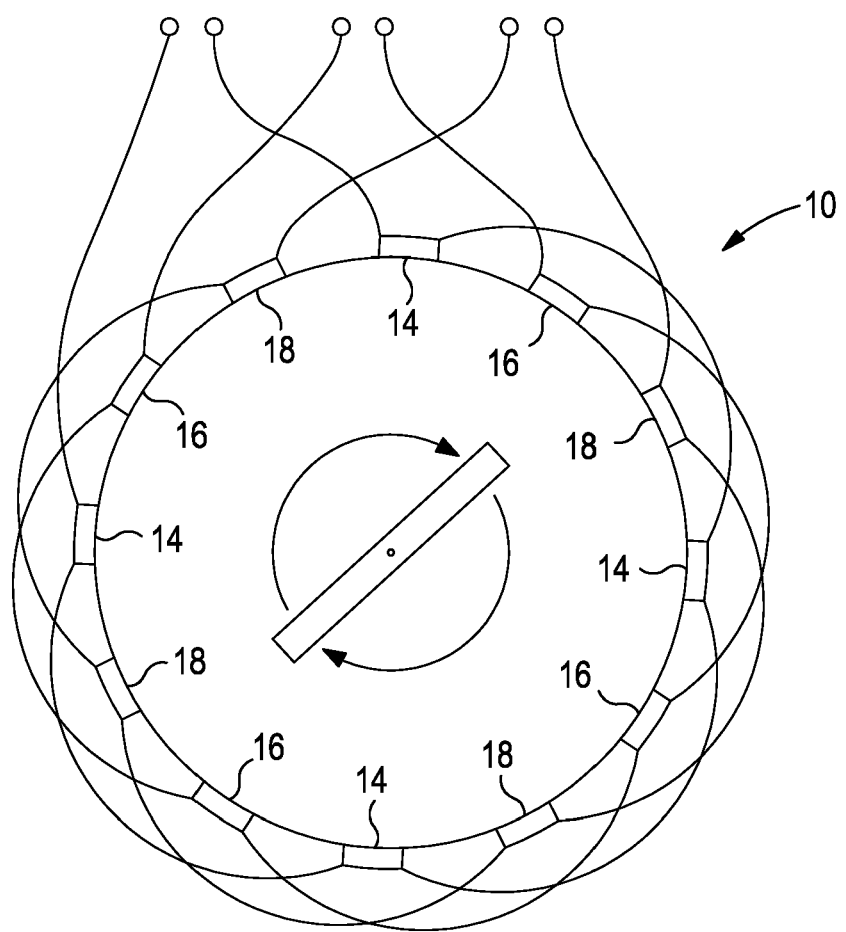
FIG. 1 illustrates a prior art three phase electric motor.
Figure 2:
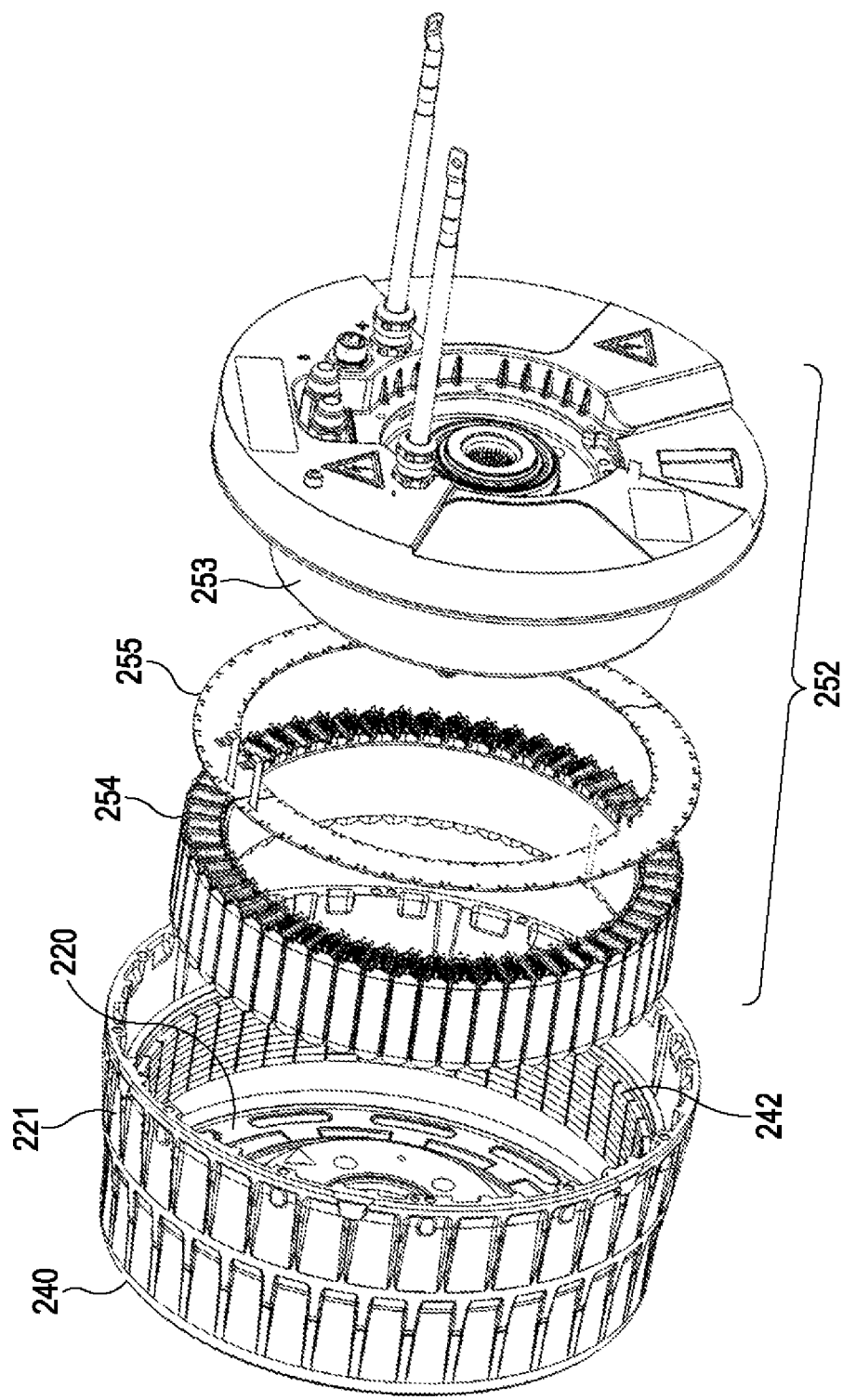
FIG. 2 illustrates an exploded view of a motor embodying the present invention.

For the purposes of the present embodiment, as illustrated in FIG. 2, the in-wheel electric motor includes a stator 252 comprising a circumferential support 253 that acts as a heat sink, multiple coils 254, two control devices (not shown) mounted on the circumferential support 253 on a rear portion of the stator for driving the coils, and an annular capacitor (not shown), otherwise known as a DC link capacitor, and a lead frame 255, described below, that is mounted between an axial edge of the coils and an axial flange formed on the circumferential support for coupling the control devices to the coils. The coils 254 are formed on stator tooth laminations to form coil windings. A stator cover is mounted on the rear portion of the stator 252, enclosing the control devices and annular capacitor to form the stator 252, which may then be fixed to a vehicle and does not rotate relative to the vehicle during use.

Figure 3:
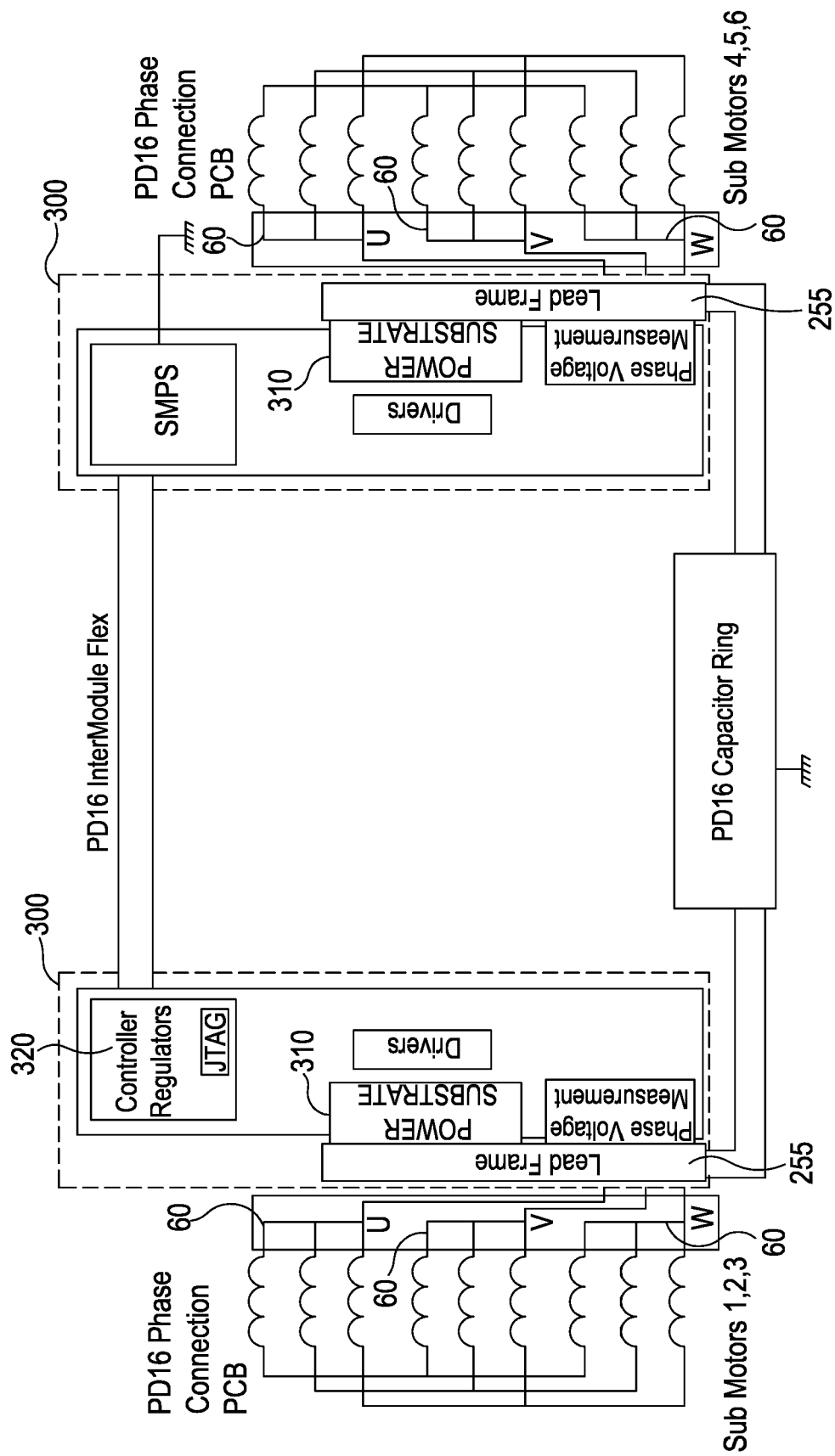
FIG. 3 illustrates a schematic representation of a control device.

As schematically represented in FIG. 3, each control device 300 includes an inverter 310 with one of the control devices including control logic 320, which in the present embodiment includes a processor, for controlling the operation of both inverters 310. Each inverter is coupled to three sets of coil windings, arranged electrically in parallel, to form a set of three sub motors, as described below.

The annular capacitor is coupled between the inverters 310 and the electric motor's DC power source for reducing voltage ripple on the electric motor's power supply line, otherwise known as the DC busbar, and for reducing voltage overshoots during operation of the electric motor. For reduced inductance the capacitor is preferably mounted adjacent to the control devices 300.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block (not shown). The bearing block can be a standard bearing block as would be used in a vehicle to which this motor assembly is to be fitted. The bearing block comprises two parts, a first part fixed to the stator and a second part fixed to the rotor. The bearing block is fixed to a central portion of the wall of the stator 252 and also to a central portion of the housing wall 220 of the rotor 240. The rotor 240 is thus rotationally fixed to the vehicle with which it is to be used via the bearing block at the central portion of the rotor 240. This has an advantage in that a wheel rim and tyre can then be fixed to the rotor 240 at the central portion using the normal wheel bolts to fix the wheel rim to the central portion of the rotor and consequently firmly onto the rotatable side of the bearing block. The wheel bolts may be fitted through the central portion of the rotor through into the bearing block itself. With both the rotor 240 and the wheel being mounted to the bearing block there is a one to one correspondence between the angle of rotation of the rotor and the wheel.

The rotor also includes a set of magnets (not shown) for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

In the present embodiment the electric motor includes six coil sets with each coil set having three coil sub-sets that are coupled in a wye configuration to form a three phase sub-motor, resulting in the motor having six three phase sub-motors, where as stated above the respective coils of the six coil sets are wound on individual stator teeth, which form part of the stator. The operation of the respective sub-motors is controlled via one of two control devices 300, as described below. Although the present embodiment describes an electric motor having six coil sets (i.e. six sub motors) the motor may equally have one or more coil sets with associated control devices. Equally, each coil set may have any number of coil sub-sets, thereby allowing each sub-motor to have two or more phases.

FIG. 3 illustrates the connections between the respective coil sets 60 and the control devices 300, where three coil sets 60 are connected to a respective three phase inverter 310 included on a control device 300. As is well known to a person skilled in the art, a three phase inverter contains six switches, where a three phase alternating voltage may be generated by the controlled operation of the six switches. However, the number of switches will depend upon the number of voltage phases to be applied to the respective sub motors, where the sub motors can be constructed to have any number of phases. Each control device 300 is arranged to communicate with the other control device 300 via a communication bus 330.

Preferably, the control devices 300 are of a modular construction. In a preferred embodiment each control device, otherwise known as a power module, includes a power printed circuit board on which is mounted a control printed circuit board, two power source busbars for connecting to a DC battery via the DC link capacitor, three phase winding busbars for connecting to respective coil windings via the lead frame, and a power substrate assembly, which includes an inverter.

The power printed circuit board includes a variety of other components that include drivers for the inverter switches formed on the power substrate assembly, where the drivers are used to convert control signals from the control printed circuit board into a suitable form for operating switches mounted on the power printed circuit board, however these components will not be discussed in any further detail.

One of the control devices 300 includes a processor 320 for controlling the operation of the inverter switches in both control devices 300. Additionally, each control device 300 includes an interface arrangement to allow communication between the respective control devices 300 via a communication bus with one control device 300 being arranged to communicate with a vehicle controller mounted external to the electric motor.

The processor 320 in the respective control device 300 is arranged to control the operation of the inverter switches mounted within each control device 300 to allow each of the electric motor coil sets 60 to be supplied with a three phase voltage supply, thereby allowing the respective coil sub-sets to generate a rotating magnetic field. As stated above, although the present embodiment describes each coil set 60 as having three coil sub-sets, the present invention is not limited by this and it would be appreciated that each coil set 60 may have one or more coil sub-sets.

Under the control of the processor, each three phase bridge inverter 310 is arranged to provide PWM voltage control across the respective coil sub-sets, thereby generating a current flow in the respective coil sub-sets for providing a required torque by the respective sub-motors.

PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 310 switches are arranged to apply a single voltage phase across each of the coil sub-sets.

Using PWM switching, the plurality of switches are arranged to apply an alternating voltage across the respective coil sub-sets. The voltage envelope and phase angle of the electrical signals is determined by the modulating voltage pulses.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit. A single phase inverter will have two pairs of switches arranged in series to form two legs of an inverter.

The inverter formed on the power assembly in one control device is coupled to three coil sets, to form a first set of three sub motors, with the inverter formed on the power assembly in the other control device being coupled to the other coil sets, to form a second set of three sub motors.

Both inverters are coupled to the respective coil sets via the lead frame, where each leg of the respective inverters is coupled to the lead frame via a respective phase winding busbar. For the purposes of the present embodiment, the different voltage phases generated by each inverter leg are designated W, V and U.

The coil windings are coupled to the lead frame 255, as described below, to allow current to flow from the DC power source via the respective inverters in the control devices to the coil windings to allow drive torque to be generated by the electric motor.

Figure 4:
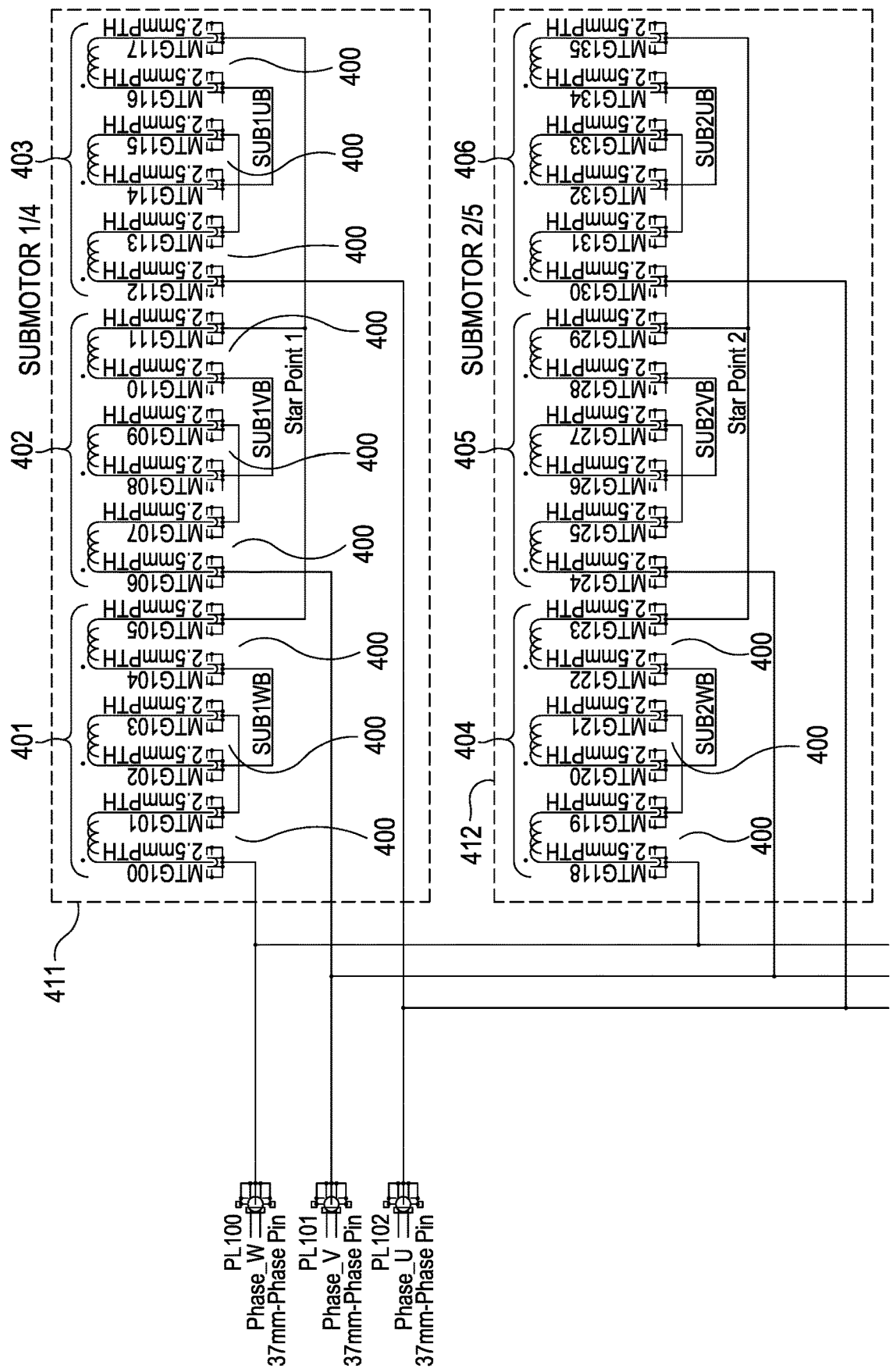
FIG. 4 illustrate the electrical connections provided by a lead frame according to an embodiment of the present invention.
Figure 4:
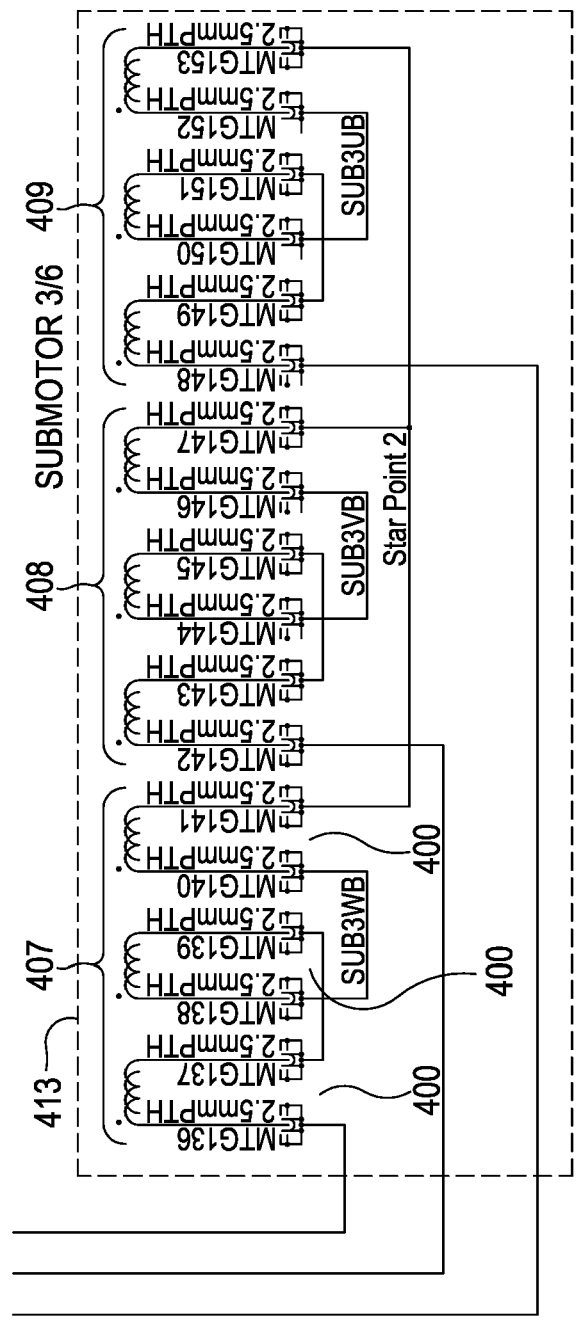

FIG. 4 illustrates the electrical connections that the lead frame 255 provides between the phase winding busbars for one of the control devices and coil windings mounted on the stator, where the lead frame 255 is arranged to couple the phase windings for the respective coil sub-sets in a wye configuration. However, the lead frame 255 can be configured to couple the phase windings for the respective coil subsets in different configurations. As described above, each coil sub-set includes three coil windings (i.e. phase windings) to form a three phase sub motor.

Although, each coil winding/phase winding within each respective coil subset may be configured as a single, independent, coil winding, the coil winding may comprise two or more separate coils that are serially connected. For the purposes of the present embodiment, each of the coil windings that form a coil sub-set is formed from three separately wound coils that are coupled via a circuit board layer of the lead frame, as described below.

With reference to FIG. 4, coils 401 form a first phase winding of a first sub motor 411, coils 402 form a second phase winding of the first sub motor 411, and coils 403 form a third phase winding of the first sub motor 411. With respect to the second sub motor 412, coils 404 form a first phase winding of the second sub motor 412, coils 405 form a second phase winding of the second sub motor 412, and coils 406 form a third phase winding of the second sub motor 412. With respect to the third sub motor 413, coils 407 form a first phase winding of the third sub motor 413, coils 408 form a second phase winding of the third sub motor 413, and coils 409 form a third phase winding of the third sub motor 413.

Each coil 400 illustrated in FIG. 4 corresponds to a coil wound on a single stator tooth, where the end sections of each coil are arranged to be coupled to the lead frame 255 to allow the coils to be coupled in the configuration shown in FIG. 4.

The lead frame 255 is arranged to connect the W phase inverter busbar to the first coil 400 of the first phase winding 401 of the first sub motor 411, the first phase winding 404 of the second sub motor 412 and the first phase winding 407 of the third sub motor 413.

The lead frame also connects the V phase inverter busbar to the first coil 400 of the second phase winding 402 of the first sub motor 411, the second phase winding 405 of the second sub motor 412 and the second phase winding 408 of the third sub motor 413 and connects the U phase inverter busbar to the first coil 400 of the third phase winding 403 of the first sub motor 411, the third phase winding 406 of the second sub motor 412 and the third phase winding 409 of the third sub motor 413.

As illustrated in FIG. 4, the lead frame 255 connects the last coil 400 of the first phase winding 401 of the first sub motor 411 to the last coil 400 of the second phase winding 402 and third phase winding 403 of the first sub motor 411. Similarly, the lead frame 255 also connects the last coil 400 of the first phase winding 404 of the second sub motor 412 to the last coil 400 of the second phase winding 405 and third phase winding 406 of the second sub motor 412 and connects the last coil 400 of the first phase winding 407 of the third sub motor 413 to the last coil of the second phase winding 408 and third phase winding 409 of the third sub motor 413. These connections acts as the star point for each of the respective sub motors.

Additionally, the lead frame 255 is arranged to electrically connect the respective coils 400 for each phase winding to form a serial connection between the respective coils 400 for each phase winding.

Accordingly, the lead frame provides the electrical connections between the W, V, U phase inverter busbars and the respective coils 400 to form three sub motors driven by a single inverter 310, where the coil windings of the respective sub motors are coupled in a wye configuration.

Similarly, the lead frame 255 also couples the phase winding busbars for the inverter 310 for the other control device 300 and coils mounted on the stator in the same manner to form three further sub motors driven by the inverter 310 in the second control device 300.

Figure 5:
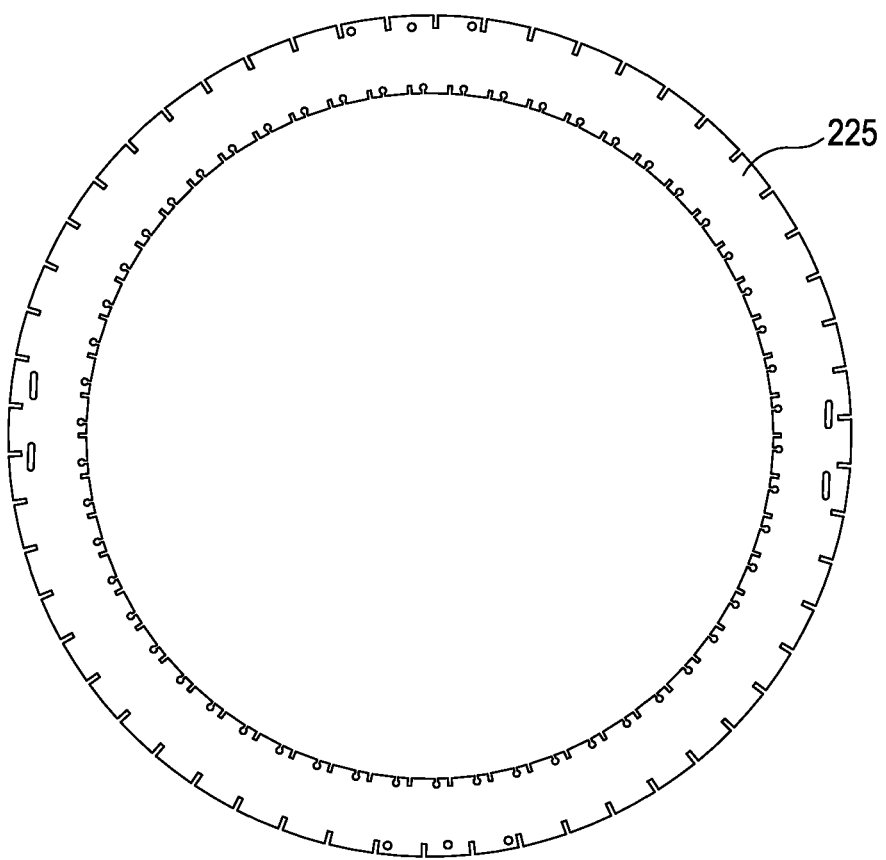
FIG. 5 illustrates a lead frame according to an embodiment of the present invention.

The configuration of the lead frame 255 will now be described, where in a first embodiment a single, substantially, circumferential lead frame, as illustrated in FIG. 5, is used for providing current from both control devices to the respective coil sets. As illustrated in FIG. 6 the substantially circumferential lead frame 255 is mounted to an axial mounting surface of a stator back-iron 600, which forms part of the stator 252, adjacent to the coils, where coils are wound on stator teeth formed on the stator back-iron 600.

The lead frame 255 includes a first set of three apertures 610 for receiving a respective busbar lead frame pin for coupling the lead frame 255 to an inverter 310 in the first control device 300 and a second set of three apertures 620 for receiving a respective busbar lead frame pin for coupling the lead frame 255 to an inverter 310 in the second control device 300, as described below.

The lead frame 255 is mounted to the stator back-iron 600 via the use of heat stakes 630 attached to the stator back-iron 600 at predetermined locations that are arranged to extend through apertures formed in the lead frame 255. Once the lead frame 255 is mounted on the stator back-iron 600 with the respective heat stakes 630 extending through a respective aperture formed in the lead frame 255, the heat stakes 630 are melted, thereby retaining the lead frame 255 to the stator back-iron 600. However, any suitable means for attaching the lead frame to the stator back-iron may be used.

As also illustrated in FIG. 6, the lead frame 255 includes a plurality of recesses 640 formed on both the inner and outer radial edges of the lead frame 255 for receiving the end sections of the coils wound on the stator teeth for coupling the coils 400 to the lead frame 255, as described below, where for each coil wound on a stator tooth, one end section is mounted in a recess 640 formed on the inner radial edge of the lead frame and the other end section is mounted in a recess 640 formed on the outer radial edge of the lead frame 255.

Figure 7:
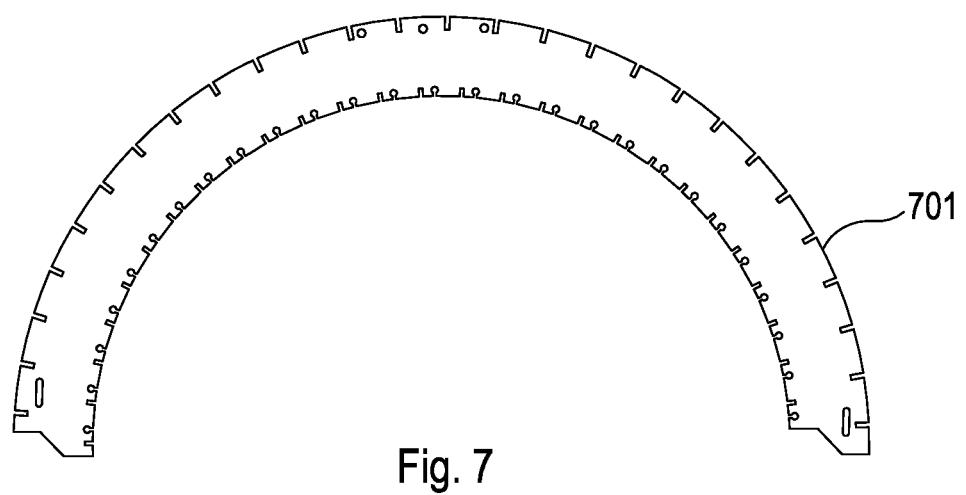
FIG. 7 illustrates a lead frame according to an embodiment of the present invention.
Figure 8:
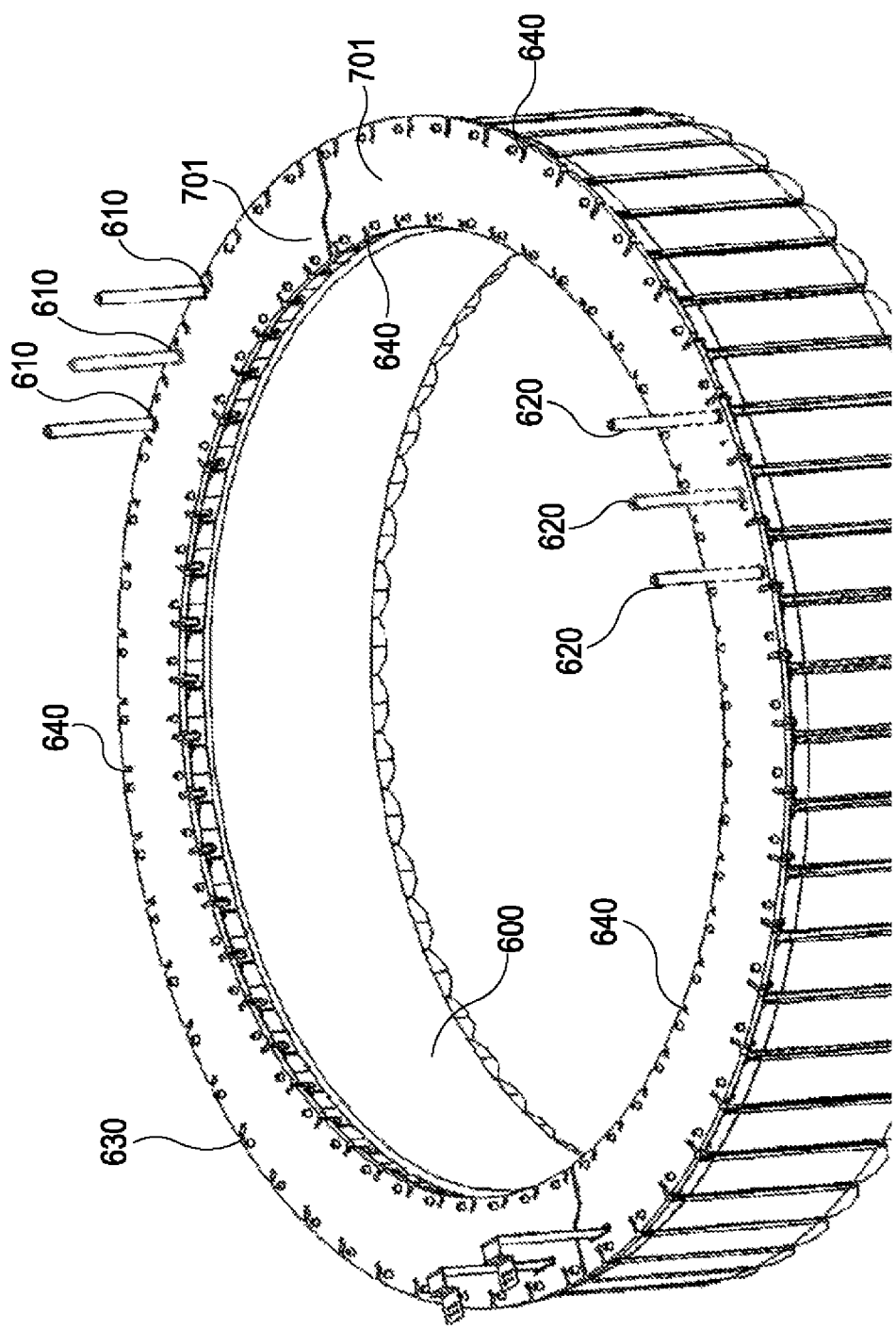
FIG. 8 illustrates a lead frame arrangement according to an embodiment of the present invention.

FIG. 7 illustrates a second embodiment of the lead frame, where the lead frame comprises a first lead frame section 701 and a second lead frame section (not shown), where preferably both the first lead frame section 701 and the second lead frame section are semi-circumferential such that when mounted on the stator 252 the first lead frame section 701 and the second lead frame section form a substantially circumferential lead frame arrangement. As illustrated in FIG. 8 each lead frame section 701 is mounted to an axial mounting surface of a stator back-iron 600, which forms part of the stator 252, adjacent to the coils, where coils are wound on stator teeth formed on the stator back-iron 600.

Both the first lead frame section and the second lead frame section includes a set of three apertures 801 for receiving a respective busbar lead frame pin for coupling the first lead frame section 701 and the second lead frame section 701 to an inverter 310 in the first control device 300 and the second control device 300 respectively.

The first lead frame section 701 and the second lead frame section 701 are mounted to the stator back-iron 600 via the use of heat stakes 630 attached to the stator back-iron 600 at predetermined locations that are arranged to extend through apertures formed in the first lead frame section 701 and the second lead frame section 701. Once the first lead frame section 701 and the second lead frame section 701 are mounted on the stator back-iron 600 with the respective heat stakes 630 extending through respective apertures formed in the first lead frame section 701 and the second lead frame section 701, the heat stakes 630 are melted, thereby retaining the first lead frame section 701 and the second lead frame section 701 to the stator back-iron 600. However, any suitable means for attaching the first lead frame section 701 and the second lead frame section 701 to the stator back-iron 600 may be used.

As also illustrated in FIG. 8, the first lead frame section 701 and the second lead frame section 701 includes a plurality of recesses 640 formed on both the inner and outer radial edges of the first lead frame section 701 and the second lead frame section 701 for receiving the end sections of the coils 400 wound on the stator teeth for coupling the coil 400 to the first lead frame section 701 and the second lead frame section 701 respectively, as described below. For each coil wound on a stator tooth, one end section is mounted in a recess 640 formed on the inner radial edge of the first lead frame section 701 or the second lead frame section 701 and the other end section is mounted in a recess 640 formed on the outer radial edge of the corresponding lead frame section 701.

In accordance with the first embodiment of the lead frame 255, as stated above, a single circumferential lead frame is used as a current path from the respective inverters 310 within the control devices 300 to the respective coil windings, where the lead frame 255 is a substantially circumferential printed circuit board having a plurality of circuit board layers having a conductive layer printed on each circuit board layer. Within this embodiment, for each circuit board layer, a printed conductive layer formed on a first half of the surface area provides the electrical connections for one of the control devices 300 and coil windings mounted on the stator, and a printed conductive layer formed on a second half of the surface area provides the electrical connections for the other control device 300 and coil windings mounted on the stator. In other words, one half of the circumference of the lead frame printed circuit board is allocated for coupling a first control device 300 to one set of coil windings to form a first set of three sub motors and a second half of the circumference of the lead frame printed circuit board is allocated for coupling a second control device 300 to a second set of coil windings to form a second set of three sub motors.

The plurality of circuit board layers are separated by a respective insulating substrate.

The printed circuit board substrate material is made of substances that do not conduct electric currents. Typically the substrate material functions as a laminated electrical insulator for the conductive layers formed on the printed circuit board.

Materials that serve as effective substrates include fibre-glass, polytetrafluoroethylene, ceramics and certain polymers, where one of the most popular substrate is FR-4. FR-4 is a fibreglass-epoxy laminate that is affordable, a good electrical insulator and is more flame-resistant than fibre-glass-only boards. However, other insulating substrates may be used.

To allow for large currents to flow from the inverters 310 to the coil windings, and hence allow the electric motor to generate sufficient torque for driving a vehicle, the conductive layer on each circuit board is arranged to extend over a substantial portion of each circuit board where each conductive layer is arrange to correspond to a specific circuit path between the respective inverters 310 and the coil windings and between the different coil subsets that form the respective sub motors, as described below.

Consequently, each circuit board layer is optimised for current flow.

To achieve the circuit configuration illustrated in FIG. 4, the configuration of the printed circuit board layers and conductive layers printed on the circuit board layers will now be described, where as the conductive layers printed on the circuit board layers for coupling one inverter 310 in one control device 300 to a first set of coil windings are, on each circuit board layer, a mirror image of the conductive layers for coupling the other inverter 310 in the second control device 300 to a second set of coil windings, only the conductive layers for coupling one inverter to one set of coil windings will be described.

Although each circuit board layer includes two sets of electrical connections for coupling three coil sub sets to one inverter and another three coil sub sets to another inverter, each circuit board layer may include any number of conductive layers based on the number of inverters. For example, if a single inverter were to be used to drive all the coil windings mounted on the stator the conductive layer printed on each circuit board layer would be arranged to form a specific circuit path between the inverter and the coil windings and between the different coil subsets that form the respective sub motors.

Figure 9:
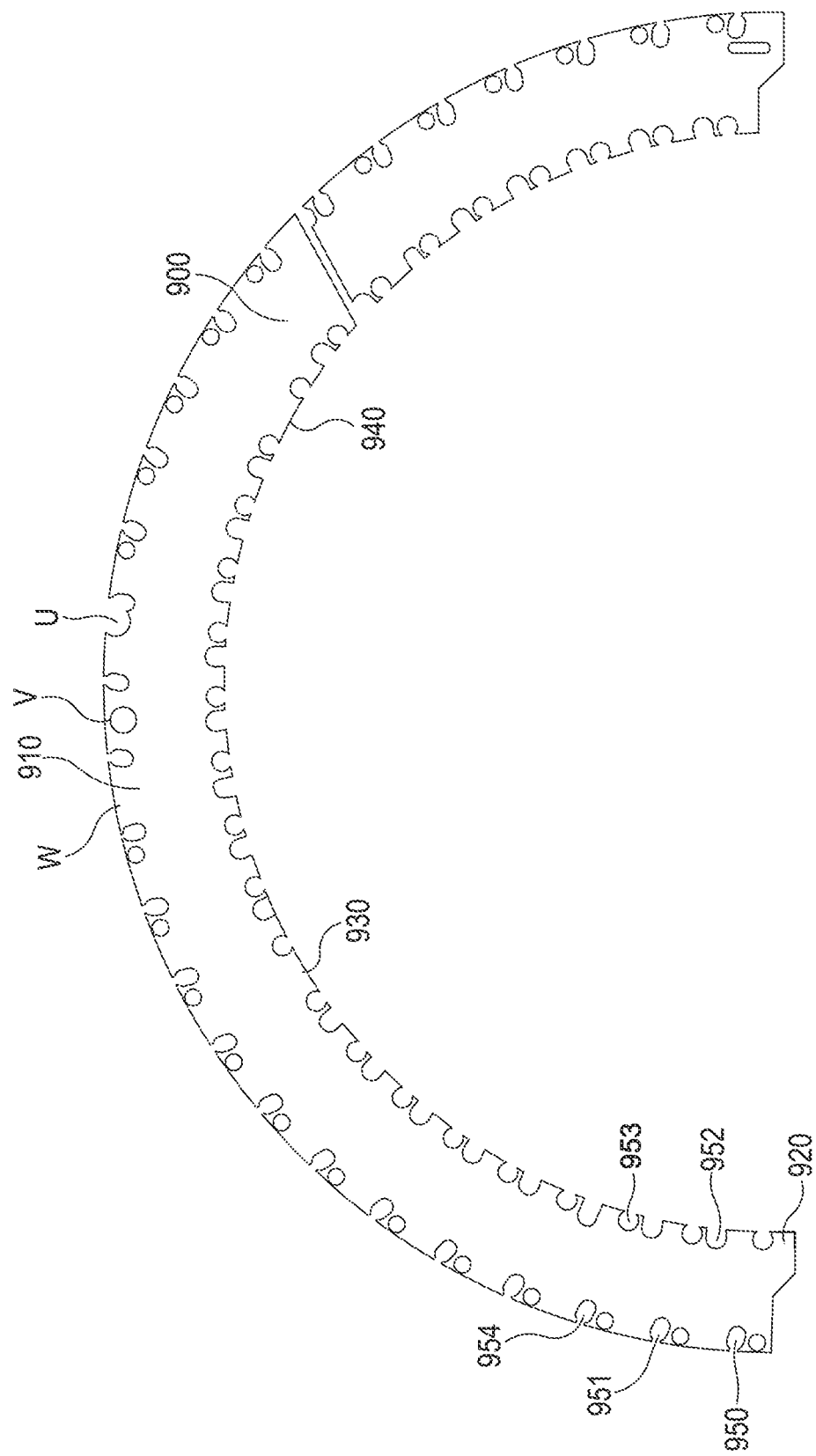
FIG. 9 illustrates a conductive layer on a circuit board layer of a lead frame according to an embodiment of the present invention.

The printed circuit board includes a first circuit board layer having a first electrically conductive layer illustrated in FIG. 9 that extends over substantially a first semi-circumferential section of the circumferential circuit board that is arranged to be electrically coupled to the W phase inverter busbar and to the first coil of the first phase winding 401 of the first sub motor 411, the first coil of the first phase winding 404 of the second sub motor 412 and the first coil of the first phase winding 407 of the third sub motor 413. As stated above, an alternative electrically conductive layer extends over substantially a second semi-circumferential section of the circumferential circuit board that is arranged to be electrically coupled to the W phase inverter busbar of the second inverter and to corresponding coil windings mounted on the stator, where the alternative electrically conductive layer is electrically isolated from the first electrically conductive layer. However as this arrangement, as with all the other circuit board layers, is a mirror image of the connections for the first inverter, the lead frame connections for coupling the second inverter to the coil windings will not be described further.

Figure 10:
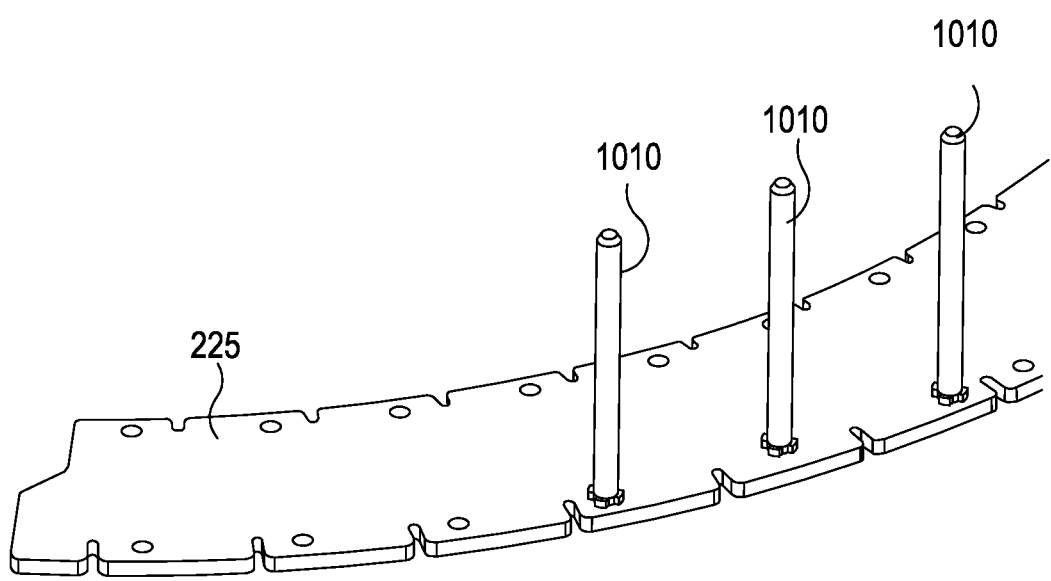
FIG. 10 illustrates a lead frame according to a lead frame according to an embodiment of the present invention.

The W phase inverter busbar is coupled to the first circuit board layer via a busbar lead frame pin 1010, as illustrated in FIG. 10, which is a cylindrical conductive element coupled to the W phase inverter busbar, where the busbar lead frame pin extends through the relevant lead frame pin aperture 610 formed in the printed circuit board. The W busbar lead frame pin 1010 is arranged to be electrically coupled to the first conductive layer 900 at location 910. To allow the first coil of the first phase winding 401 of the first sub motor 411, the first coil of the first phase winding 404 of the second sub motor 412 and the first coil of the first phase winding 405 of the third sub motor 413 to be coupled to the first conductive layer at locations 920, 930, 940, the end sections of the relevant coils are arranged to be mounted within the recesses 640 formed within the inner and outer radial edge of the lead frame 255, as described above, where the end section of the coil windings mounted within the recess formed within the inner radial edge of the lead frame at locations 920, 930, 940 and are electrically coupled to the first conductive layer 900. The other end sections of the first coils of the first phase windings for the first, second and third sub motor and the end sections of the remaining coil windings, which are mounted in respective recesses formed within the inner and outer radial edges of the lead frame, are electrically isolated from the first conductive layer.

Figure 11:
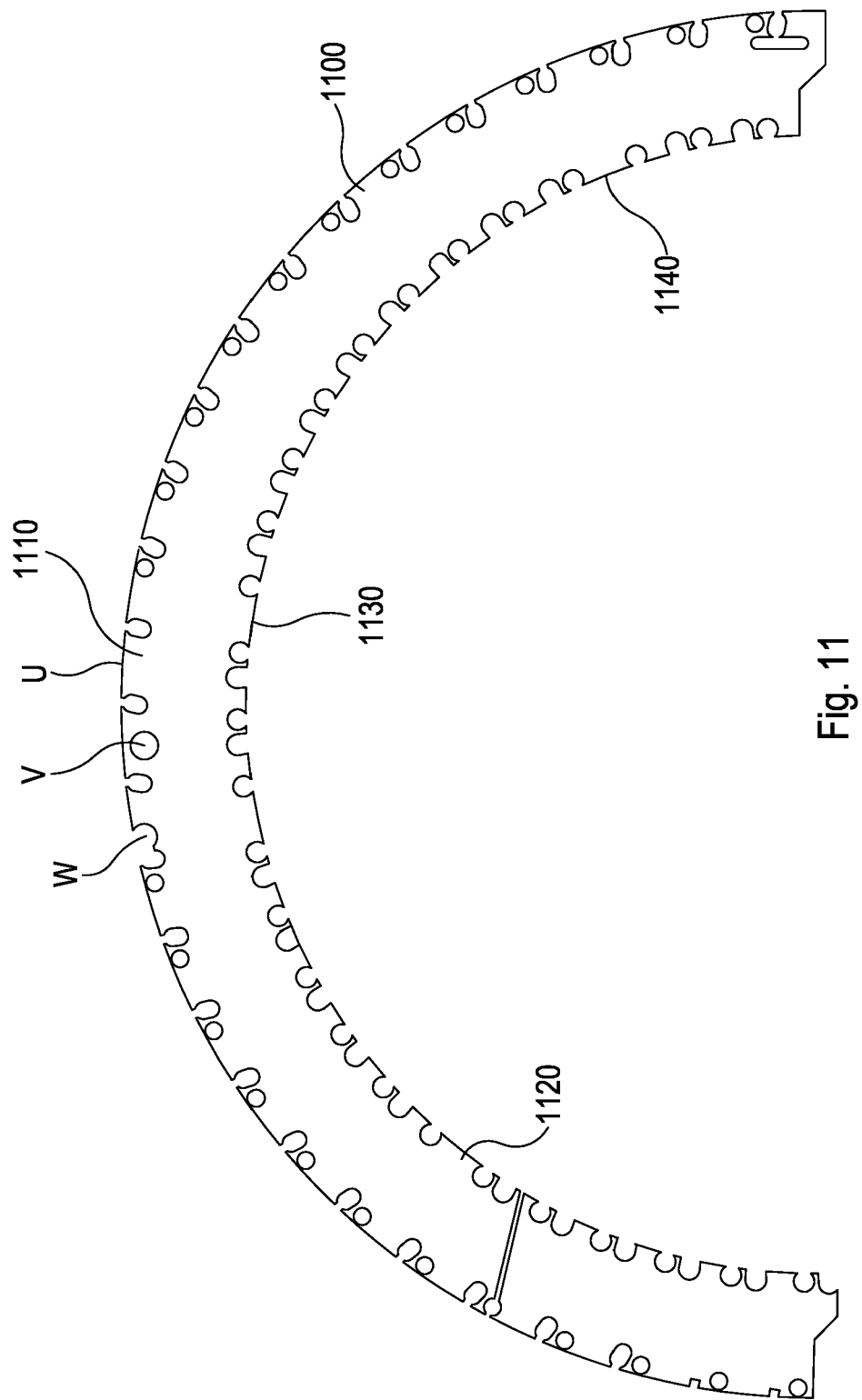
FIG. 11 illustrates a conductive layer on a circuit board layer of a lead frame according to an embodiment of the present invention.

The printed circuit board includes a second circuit board layer having a second electrically conductive layer 1100 illustrated in FIG. 11 that extends over substantially a first semi-circumferential section of the circumferential circuit board that is arranged to be electrically coupled to the U phase inverter busbar and to the first coil of the second phase winding 402 of the first sub motor 411, first coil of the second phase winding 405 of the second sub motor 412 and first coil of the second phase winding 408 of the third sub motor 413. As stated above, an alternative electrically conductive layer extends over substantially a second semi-circumferential section of the circumferential circuit board that is arranged to be electrically coupled to the U phase inverter busbar of the second inverter and to corresponding coil windings mounted on the stator, where the alternative electrically conductive layer is electrically isolated from the second electrically conductive layer. However as this arrangement, as with all the other circuit board layers, is a mirror image of the connections for the first inverter, the lead frame connections for coupling the second inverter to the coil windings will not be described further.

The U phase inverter busbar is coupled to the second circuit board layer via a busbar lead frame pin 1010, as illustrated in FIG. 10, which is a cylindrical conductive element coupled to the U phase inverter busbar that extends through the relevant lead frame pin aperture 610 formed in the printed circuit board. The U busbar lead frame pin 1010 is arranged to be electrically coupled to the second conductive layer 1100 at location 1110. To allow the first coil of the second phase winding 402 of the first sub motor 411, the first coil of the second phase winding 405 of the second sub motor 412 and the first coil of the second phase winding 408 of the third sub motor 413 to be coupled to the second conductive layer at locations 1120, 1130, 1140 respectively, the end sections of the relevant coils are arranged to be mounted within the recesses 640 formed within the inner and outer radial edge of the lead frame 255, as described above, where the end section of the coil windings mounted within the recess formed within the inner radial edge of the lead frame 255 at locations 1120, 1130, 1140 are electrically coupled to the second conductive layer. The other end sections of the first coils of the second phase windings for the first, second and third sub motor and the end sections of the remaining coil windings, which are mounted in respective recesses formed within the inner and outer radial edges of the lead frame, are electrically isolated from the second conductive layer.

Figure 12:
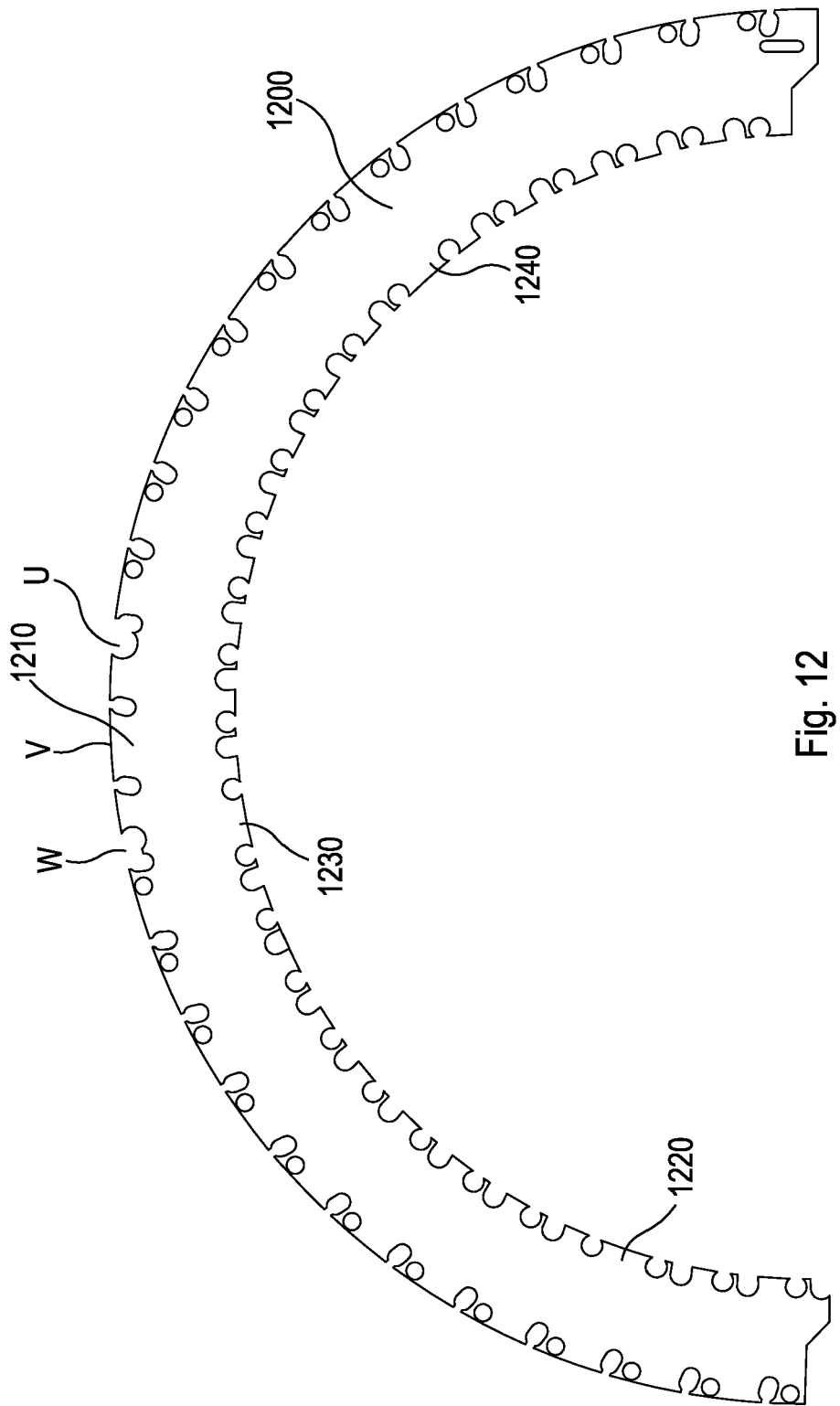
FIG. 12 illustrates a conductive layer on a circuit board layer of a lead frame according to an embodiment of the present invention.

The printed circuit board includes a third circuit board layer having a third electrically conductive layer illustrated in FIG. 12 that extends over substantially a first semi-circumferential section of the circumferential circuit board that is arranged to be electrically coupled to the V phase inverter busbar and to the first coil of the third phase winding 403 of the first sub motor 411, first coil of the third phase winding 406 of the second sub motor 412 and first coil of the third phase winding 409 of the third sub motor 413. As stated above, an alternative electrically conductive layer extends over substantially a second semi-circumferential section of the circumferential circuit board that is arranged to be electrically coupled to the V phase inverter busbar of the second inverter and to corresponding coil windings mounted on the stator, where the alternative electrically conductive layer is electrically isolated from the second electrically conductive layer. However as this arrangement, as with all the other circuit board layers, is a mirror image of the connections for the first inverter, the lead frame connections for coupling the second inverter to the coil windings will not be described further.

The V phase inverter busbar is coupled to the third circuit board layer via a busbar lead frame pin 1010, as illustrated in FIG. 10, which is a cylindrical conductive element coupled to the V phase inverter busbar that extends through the relevant lead frame pin aperture 610 formed in the printed circuit board. The V busbar lead frame pin 1010 is arranged to be electrically coupled to the third conductive layer 1200 at location 1210. To allow the first coil of the third phase winding 403 of the first sub motor 411, the first coil of the third phase winding 406 of the second sub motor 412 and the first coil of the third phase winding 409 of the third sub motor 413 to be coupled to the third conductive layer, the end sections of the relevant coils are arranged to be mounted within the recesses 640 formed within the inner and outer radial edge of the lead frame 255, as described above, where the end section of the coil windings mounted within the recess formed within the inner radial edge of the lead frame at locations 1220, 1230, 1240 are electrically coupled to the third conductive layer. The other end sections of the first coils of the third phase windings for the first, second and third sub motor and the end sections of the remaining coil windings, which are mounted in respective recesses formed within the inner and outer radial edges of the lead frame, are electrically isolated from the third conductive layer.

Figure 13:
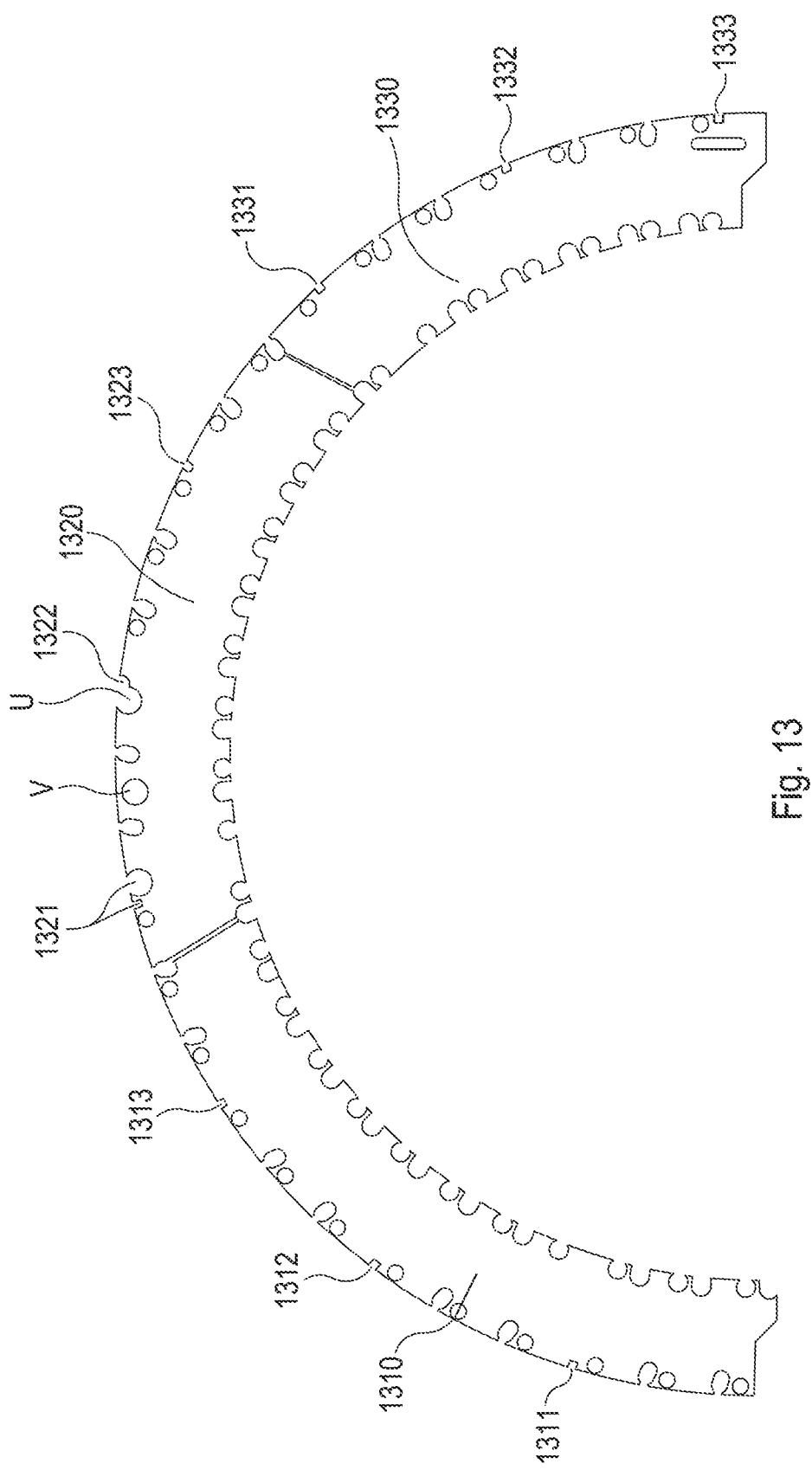
FIG. 13 illustrates a conductive layer on a circuit board layer of a lead frame according to an embodiment of the present invention

The printed circuit board includes a fourth circuit board layer having a fourth electrically conductive layer 1310, fifth electrically conductive layer 1320 and a sixth electrically conductive layer 1330, illustrated in FIG. 13, where the fourth electrically conductive layer 1310, fifth electrically conductive layer 1320 and sixth electrically conductive layer 1330 together extend over substantially a first semi-circumferential section of the circumferential circuit board. The fourth electrically conductive layer 1310, fifth electrically conductive layer 1320 and sixth electrically conductive layer 1330 are electrically isolated from each other.

The fourth electrically conductive layer 1310 is arranged to electrically couple the last coil of the first phase winding 401 of the first sub motor 411, last coil of the second phase winding 402 of the first sub motor 411 and last coil of the third phase winding 403 of the first sub motor 411 to form a neutral point (i.e. a star point) between the first coil winding 401, the second coil winding 402, and the third coil winding 403 of the first sub motor 411.

To allow the last coil of the first phase winding 401 of the first sub motor 411, the last coil of the second phase winding 402 of the first sub motor 411 and the last coil of the third phase winding 403 of the first sub motor 411 to be coupled, the end sections of the relevant coils are arranged to be mounted within the recesses 640 formed within the inner and outer radial edge of the lead frame 255, as described above, where the end section of the coil windings mounted within the recess formed within the outer radial edge of the lead frame at locations 1311, 1312, 1313 are electrically coupled to the fourth conductive layer 1310. The other end sections of the last coil of the first phase winding 401 of the first sub motor 411, the last coil of the second phase winding 402 of the first sub motor 411 and the last coil of the third phase winding 403 of the first sub motor 411 and the end sections of the remaining coil windings, which are mounted in respective recesses formed within the inner and outer radial edges of the lead frame 255, are electrically isolated from the fourth conductive layer 1310.

The fifth electrically conductive layer 1320 is arranged to electrically couple the last coil of the first phase winding 404 of the second sub motor 412, last coil of the second phase winding 405 of the second sub motor 412 and last coil of the third phase winding 406 of the second sub motor 412 to form a neutral point (i.e. a star point) between the first coil winding 404, the second coil winding 405, and the third coil winding 405 of the second sub motor 412.

To allow the last coil of the first phase winding 404 of the second sub motor 412, the last coil of the second phase winding 405 of the second sub motor 412 and the last coil of the third phase winding 406 of the second sub motor 412 to be coupled, the end sections of the relevant coils are arranged to be mounted within the recesses 640 formed within the inner and outer radial edge of the lead frame 255, as described above, where the end section of the coil windings mounted within the recess formed within the outer radial edge of the lead frame at locations 1321, 1322, 1323 are electrically coupled to the fifth conductive layer 1320. The other end sections of the last coil of the first phase winding 404 of the second sub motor 412, the last coil of the second phase winding 405 of the second sub motor 412 and the last coil of the third phase winding 406 of the second sub motor 412 and the end sections of the remaining coil windings, which are mounted in respective recesses 640 formed within the inner and outer radial edges of the lead frame 255, are electrically isolated from the fifth conductive layer 1320.

The sixth electrically conductive layer 1330 is arranged to electrically couple the last coil of the first phase winding 407 of the third sub motor 413, last coil of the second phase winding 408 of the third sub motor 413 and last coil of the third phase winding 409 of the third sub motor 413 to form a neutral point (i.e. a star point) between the first coil winding 407, the second coil winding 408, and the third coil winding 409 of the third sub motor 413.

To allow the last coil of the first phase winding 407 of the third sub motor 413, the last coil of the second phase winding 408 of the third sub motor 413 and the last coil of the third phase winding 409 of the third sub motor 413 to be coupled, the end sections of the relevant coils are arranged to be mounted within the recesses 640 formed within the inner and outer radial edge of the lead frame 255, as described above, where the end section of the coil windings mounted within the recess formed within the outer radial edge of the lead frame at locations 1331, 1332, 1333 are electrically coupled to the sixth conductive layer 1330. The other end sections of the last coil of the first phase winding 407 of the third sub motor 413, the last coil of the second phase winding 408 of the third sub motor 413 and the last coil of the third phase winding 409 of the third sub motor 413 and the end sections of the remaining coil windings, which are mounted in respective recesses 640 formed within the inner and outer radial edges of the lead frame 255, are electrically isolated from the sixth conductive layer 1330.

Figure 14:
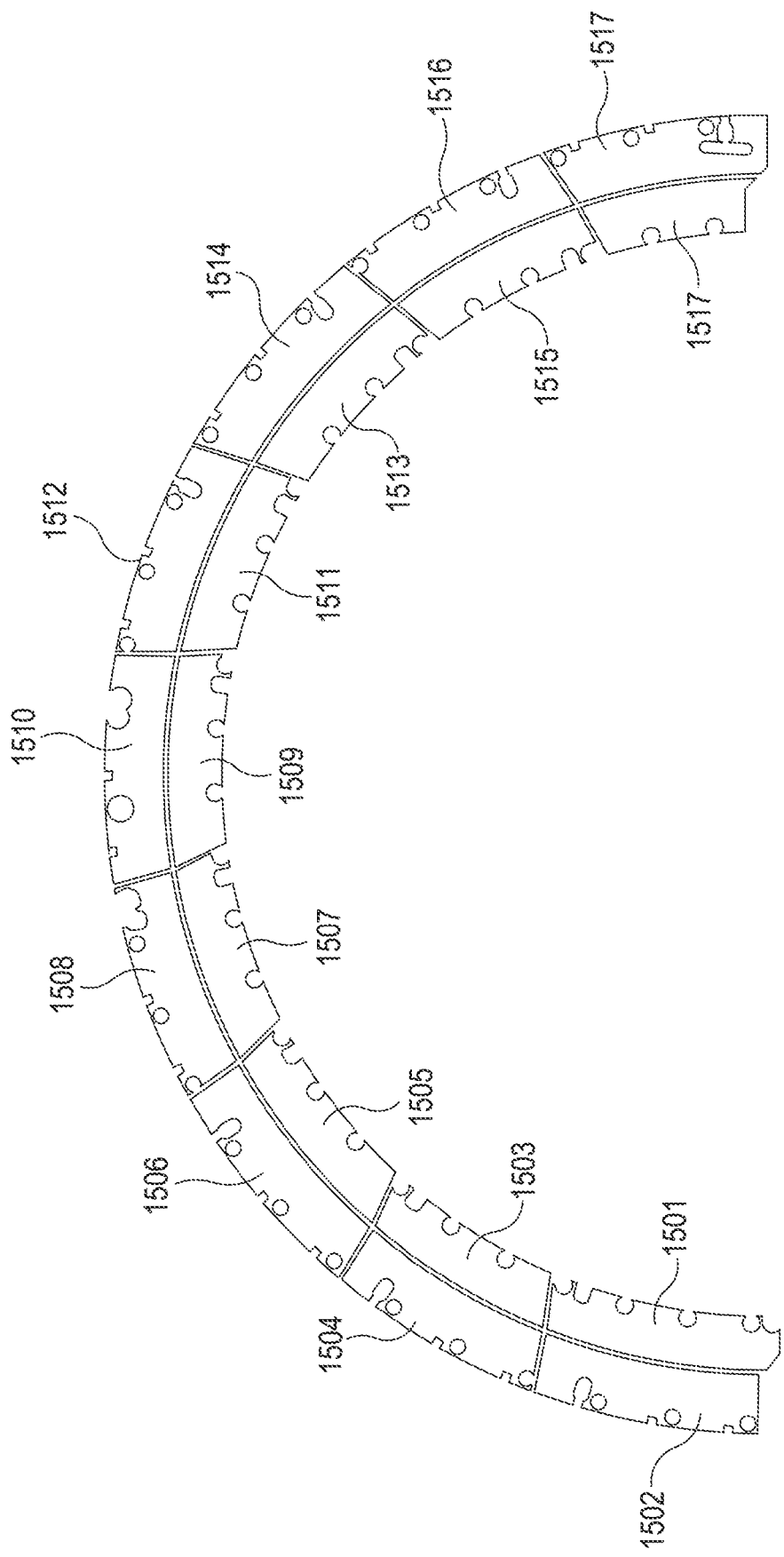
FIG. 14 illustrates a conductive layer on a circuit board layer of a lead frame according to an embodiment of the present invention.

The printed circuit board includes a fifth circuit board layer having a plurality of electrically conductive layers illustrated in FIG. 14 for electrically coupling coils 400 that form the first phase winding 401 of the first sub motor 411, coils 400 that form the second phase winding 402 of the first sub motor 411, and coils 400 that form the third phase winding 402 of the first sub motor 411. With respect to the second sub motor, the plurality of electrically conductive layers are arranged to electrically couple coils 400 that form the first phase winding 404 of the second sub motor 412, coils 400 that form the second phase winding 405 of the second sub motor 412, and coils 400 that form the third phase winding 406 of the second sub motor 412. With respect to the third sub motor, the plurality of electrically conductive layers are arranged to electrically couple coils 400 that form the first phase winding 407 of the third sub motor 413, coils 400 that form the second phase winding 408 of the third sub motor 413, and coils 400 that form the third phase winding 409 of the third sub motor 413.

Preferably the plurality of electrically conductive layers on the fifth circuit board layer are arranged to allow the plurality of coils for each respective coil sub-set to be coupled such that each coil within a coil winding produces a magnetic field that is anti-parallel with its adjacent coil for a given direction of current flow while having a common phase.

Of the plurality of electrically conductive layers formed on the fifth printed circuit board layer, two electrically conductive layers 1501, 1502 are used for coupling coils 400 that form the first phase winding 401 of the first sub motor 411, two electrically conductive layers 1503, 1504 are used for coupling coils 400 that form the second phase winding 402 of the first sub motor 411, and two electrically conductive layers 1505, 1506 are used for coupling coils 400 that form the third phase winding 403 of the first sub motor 411. With respect to the second sub motor, two electrically conductive layers 1507, 1508 are used for coupling coils 400 that form the first phase winding 404 of the second sub motor 412, two electrically conductive layers 1509, 1510 are used for coupling coils 400 that form the second phase winding 405 of the second sub motor 412, and two electrically conductive layers 1511, 1512 are used for coupling coils 400 that form the third phase winding 406 of the second sub motor 412. With respect to the third sub motor, two electrically conductive layers 1513, 1514 are used for coupling coils 400 that form the first phase winding 407 of the third sub motor 413, two electrically conductive layers 1515, 1516 are used for coupling coils 400 that form the second phase winding 408 of the third sub motor 413, and two electrically conductive layers 1517, 1518 are used for coupling coils 400 that form the third phase winding 409 of the third sub motor 413.

By way of illustration, the connections for coupling coils 400 will be described.

As stated above, one end section of the first coil that forms the set of coils that form the first phase winding 401 of the first sub motor 411 is mounted in a recess 640 formed on the inner radial edge of the lead frame 255 at location 920 and is electrically coupled to the first electrically conductive layer 900 formed on the first circuit board layer while being electrically isolated from any other electrically conductive layers on the other circuit board layers. The other end of the first coil is mounted in an opposite recess formed on the outer radial edge of the lead frame at location 950 and is electrically coupled to electrically conductive layer 1502 on the fifth circuit board layer.

One end section of the second coil that forms the set of coils that form the first phase winding 401 of the first sub motor 411 is mounted in recess formed on the outer radial edge of the lead frame at location 951 and is electrically coupled to electrically conductive layer 1502 on the fifth circuit board layer, thereby electrically connecting the second coil to the W phase busbar pin via the first coil.

The other end of the second coil is mounted in an opposite recess formed on the inner radial edge of the lead frame at location 952 and is electrically coupled to electrically conductive layer 1501 on the fifth circuit board layer that is electrically isolated from electrically conductive layer 1502.

One end section of the third coil that forms the set of coils that form the first phase winding 401 of the first sub motor 411 is mounted in recess formed on the inner radial edge of the lead frame at location 953 and is electrically coupled to electrically conductive layer 1501 on the fifth circuit board layer, thereby electrically connecting the third coil to the W phase busbar pin via the first and second coils. The other end of the third coil is mounted in an opposite recess formed on the outer radial edge of the lead frame at location 954 and is electrically coupled to the fourth conductive layer 1310 on the fourth circuit board layer for coupling the third coil to the corresponding coil for the second phase winding 402 and the third phase winding 403 that form the first sub motor 411.

In a similar fashion, the next set of two conductive layers 1503, 1504 on the fifth circuit board layer are used to couple coils 400 that form the second phase winding 402 of the first sub motor 411 to the V phase busbar pin, and the next set of two conductive layers 1505, 1506 on the fifth circuit board layer are used to couple coils 400 that form the third phase winding 403 of the first sub motor 411 to the U phase busbar pin.

The next set of two conductive layers 1507, 1508 on the fifth circuit board layer are used to couple coils 400 that form the first phase winding 404 of the second sub motor 412 to the W phase busbar pin the next set of two conductive layers 1509, 1510 on the fifth circuit board layer are used to couple coils 400 that form the second phase winding 405 of the second sub motor 412 to the V phase busbar pin, and the next set of two conductive layers 1511, 1512 on the fifth circuit board layer are used to couple coils 400 that form the third phase winding 406 of the second sub motor 412 to the U phase busbar pin.

The next set of two conductive layers 1513, 1514 on the fifth circuit board layer are used to couple coils 400 that form the first phase winding 407 of the third sub motor 413 to the W phase busbar pin the next set of two conductive layers 1515, 1516 on the fifth circuit board layer are used to couple coils 400 that form the second phase winding 408 of the third sub motor 413 to the V phase busbar pin, and the next set of two conductive layers 1517, 1518 on the fifth circuit board layer are used to couple coils 400 that form the third phase winding 409 of the third sub motor 413 to the U phase busbar pin.

In a preferred embodiment, to allow for increased current flow, and consequently increase torque, one or more of the circuit board layers may be duplicated. Accordingly, the first circuit board layer may be replaced with two circuit board layers having the same configuration as the first circuit board layer, thereby doubling the conductive area provided by the first circuit board.

Similarly, the second circuit board layer may be replaced with two circuit board layers having the same configuration as the second circuit board layer, the third circuit board layer may be replaced with two circuit board layers having the same configuration as the third circuit board layer, the fourth circuit board layer may be replaced with two circuit board layers having the same configuration as the fourth circuit board layer, and the fifth circuit board layer may be replaced with two circuit board layers having the same configuration as the fifth circuit board layer.

The electrical connection for coupling the W, U, V phase busbar pins and the respective coils to the lead frame will now be described.

Figure 15:
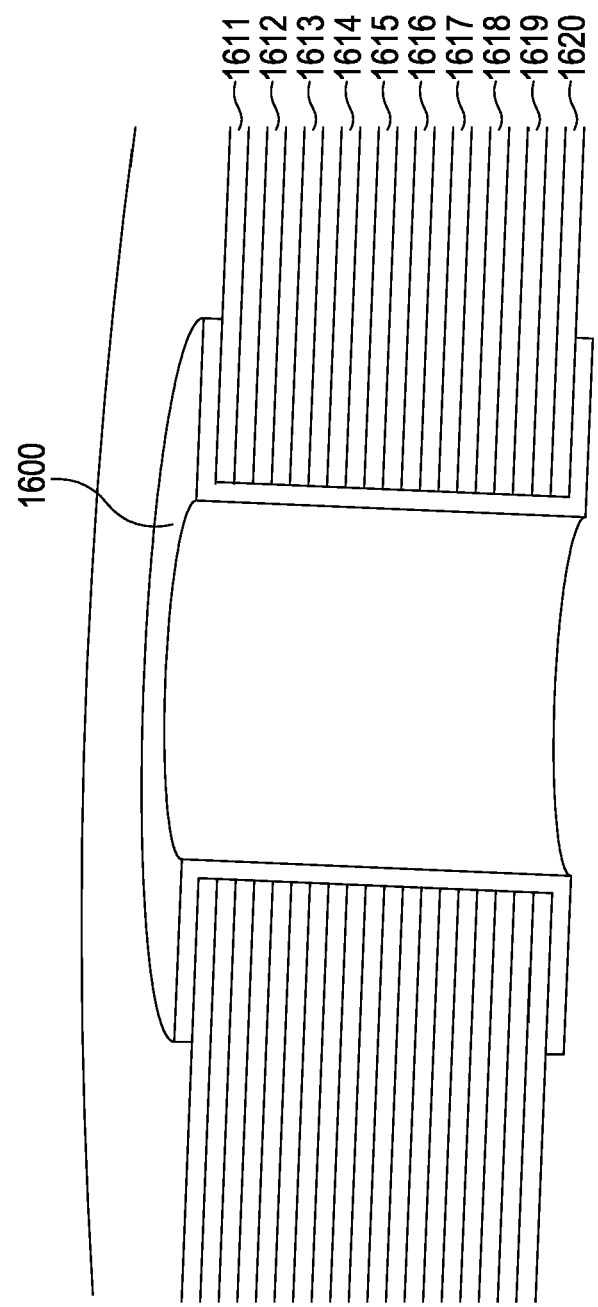
FIG. 15 illustrates a lead frame according to an embodiment of the present invention.

With regard to the electrical connections for coupling the phase busbar pins 1010 to the respective conductive layers printed on the lead frame circuit board layers, an electrically conductive sleeve 1600 is inserted into the respective apertures formed in the lead frame for the W, U, V phase busbar pins 1010, as illustrated in FIG. 15. When the W, U, V phase busbar pins are inserted into the respective electrically conductive sleeves 1600 the phase busbar pins 1010 are arranged to be in electrical contact with the sleeves 1600. For improved electrical contact between the pins 1010 and the sleeve 1600, solder or other electrically conductive material may be used.

For any conductive layers formed on the respective circuit board layers that need to be electrically connected to a phase busbar pin 1010, the respective conductive layers are arranged to extend and be in electrical contact to the electrically conductive sleeve 1600.

For any conductive layers formed on the respective circuit board layers that are electrically isolated from a phase busbar pin 1010, the respective conductive layers are arranged to be electrically isolated from the electrically conductive sleeve 1600.

For example, with reference to in FIG. 15, the lead frame includes ten circuit board layers, where the first two circuit board layers 1611, 1612 correspond to the first circuit board layer described above for coupling the W busbar lead frame pin to the lead frame, the next two circuit board layers 1613, 1614 correspond to the second circuit board layer described above for coupling the U busbar lead frame pin to the lead frame, the next two circuit board layers 1615, 1616 correspond to the third circuit board layer described above for coupling the V busbar lead frame pin to the lead frame, the next two circuit board layers 1617, 1618 correspond to the fourth circuit board layer described above for coupling the first phase winding, the second phase winding and the third phase winding of the respective sub motors, with the next two circuit board layers 1619, 1620 corresponding to the fifth circuit board layer described above for coupling the coils for the respective phase windings. As illustrated in FIG. 15, the first conductive layers on the first two circuit board layers 1611, 1612 are in contact with the electrically conductive sleeve for coupling the W busbar lead frame pin to these two conductive layers. In contrast the conductive layers printed on the other circuit board layers are electrically isolated from the electrically conductive sleeve.

Although, the present embodiment uses an electrically conductive sleeve 1600 for electrically coupling a busbar lead frame pin 1010 to the lead frame 255, any mechanism may be used for coupling the respective inverter legs to the lead frame 255.

With regard to the end sections of the respective coils, a similar arrangement to that used for electrically coupling the phase busbar pins 1010 may be used for electrically coupling the respective end sections of the coils 400 to a required conductive layer printed on one or more of the circuit board layers, where a semicircular conductive sleeve is placed within the respective recesses formed in the inner and outer radial edges of the lead frame. Alternatively, the end sections of the respective coils 400 may be placed directly within the recess 640 formed in the inner and outer radial edges of the lead frame 255 with a conductive material placed between the end sections of the coils and the relevant conductive layers for improved conductivity between the end sections of the respective coils and the conductive layers with which they are intended to be electrically connection.

A preferred process for mounting the end sections of the coils 400 in the inner and outer radial recesses 640 of the lead frame 255 will now be described.

Prior to the mounting of the lead frame 255 to the stator back iron 600, the end sections of the coils are arranged to extend in a radial direction away from the stator back iron 600 in the same plane as the axial mounting surface of the stator back iron 600. In this configuration, the end section of a coil on the outer radial edge of the stator back iron 600 is arranged to extend in a radial direction away from the centre of the stator back iron 600 and the end section of the coil on the inner radial edge of the stator back iron 600 is arranged to extend in a radial direction towards the centre of the stator back iron 600.

Figure 16:
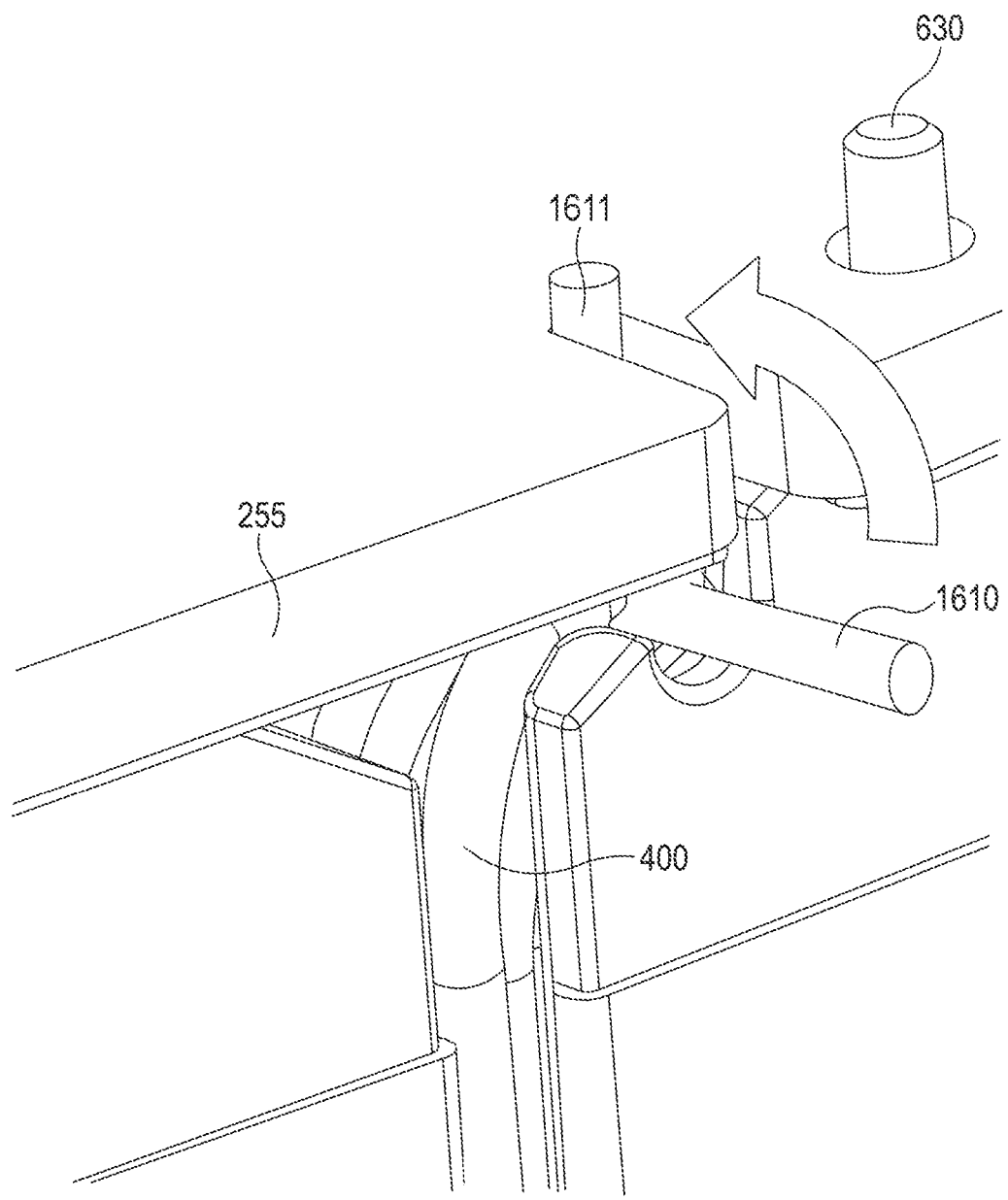
FIG. 16 illustrates an electric motor according to an embodiment of the present invention.

As stated above, the lead frame 255 is then mounted on the axial mounting surface of the stator back iron 600, preferably via the use of heat stakes, where the recesses formed in the inner and outer radial edges of the lead frame 255 are arranged to align with the end sections of the coils such that the respective recesses 640 formed in the inner and outer radial edges of the lead frame 255 are positioned over a respective end section of a coil, where FIG. 16 illustrates one coil end section 1610 extending in a radial direction away from the stator back iron 600. The end sections of the respective coils are then rotated by ninety degrees to extend into the lead frame recess 640 positioned above the respective end sections of the respective coils, thereby resulting in the coil end section 1621 extending in an axial direction. Any means may be used for rotating the end sections into the respective recess formed on the inner and outer radial edge of the lead frame.

With reference to FIG. 16, the end section of a coil prior to being positioned within an axial recess 640 formed in the lead frame 255 is shown in solid, whereas the dashed version of the end section shown in FIG. 16 represents the position of the end section of the coil once it has been rotated ninety degrees into the recess 640.

Figure 17:
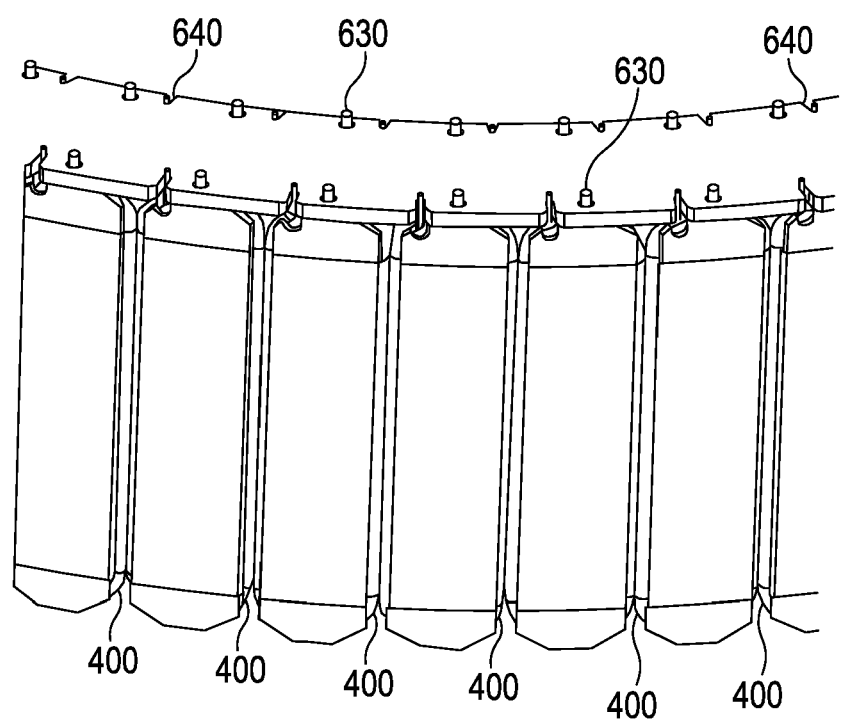
FIG. 17 illustrates a stator back iron, coil windings and a lead frame according to an embodiment of the present invention.

FIG. 17 illustrates a section of the stator back iron showing seven coils 400 with their respective coil end sections extending into an inner and outer radial recess 640 formed in the lead frame 255 for coupling the respective coils to the lead frame 255, as described above. As stated above, for improved electrical contact between the end sections of the respective coils and the lead frame 255, solder, or some other electrically conductive material may be used to between the end section of the coils and the lead frame 255.

Figure 18:
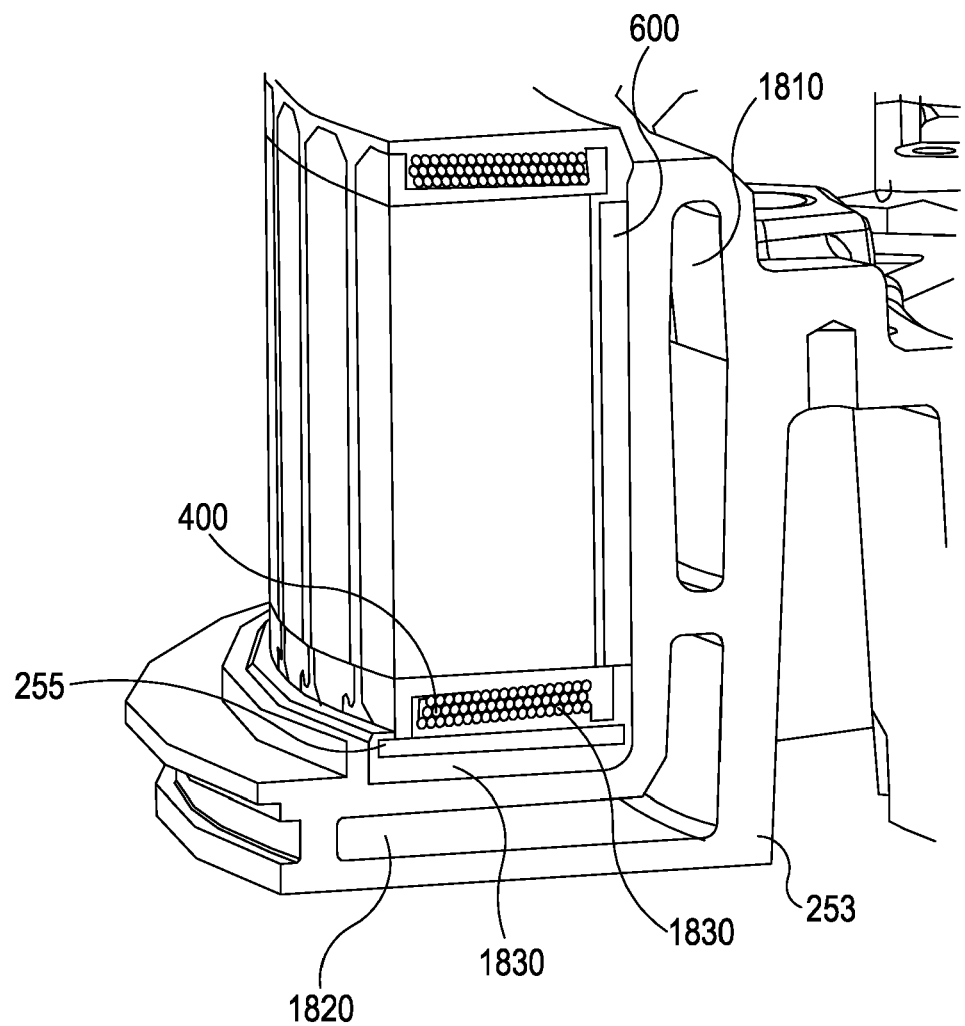
FIG. 18 illustrates a stator according to an embodiment of the present invention.

Once the lead frame 255 has been mounted on the stator back iron 600 and the end sections of the coils have been coupled to the lead frame 255, the stator back iron 600 is arranged to be mounted to the stator heat sink 253, as illustrated in FIG. 18.

Preferably, the stator back iron 600 is mounted on the stator heat sink 253 via a hot drop mechanism, for example as described in Patent GB2562196, however, any suitable mechanism may be used.

To allow for cooling of the stator back iron 600, the coils 400 and the lead frame 255, the stator head sink 253 has a cooling channel having a first section 1810 that is arranged to extend along the inner axial edge of the stator teeth and back iron 600, and a second section 1820 that is arranged to extend in a radially outward direction that is parallel to the axial mounting surface of stator back iron 600 on which the lead frame is mounted, as illustrated in a cross sectional view of the stator shown in FIG. 18.

For improved thermal conductivity between the stator heat sink 253 and the lead frame 255, potting material 1830 is placed between the heat sink 253 and the lead frame 255 and between the lead frame 255 and the stator coils 400. Typically the potting material 1830 used is arranged to provide good thermal conductivity. One example of a suitable potting material is ceramic filled epoxy resin; however other types of potting material may be used.

With regard to the second embodiment, the lead frame configuration is the same as that described above with respect to the first embodiment other than two semi circular lead frame sections 701 having a plurality of printed circuit board layers are used for mounting the conductive layers for coupling an inverter 310 to a plurality of coils. In other words, a first lead frame section 701 has a first set of printed circuit boards having conductive layers, as described above, for coupling a first inverter 310 to a first set of coils 400 to form a first set of three sub motors, with a second lead frame section 701 having a second set of printed circuit boards having conductive layers, as described above, for coupling a second inverter 310 to a second set of coils 400 to form a second set of three sub motors.

For this embodiment, as a result of each lead frame section 701 only forming a semi circular section, this has the advantage of reducing manufacturing costs for the overall lead frame arrangement compared to the manufacturing costs for a single circumferential lead frame.

In a further preferred embodiment of the lead frame, for improved current flow, if there are portions of a conductive layer on one or more printed circuit board layers, where current flow is not required, these sections of the conductive layer can be isolated from the rest of the conductive layer and used as an additional current path for conductive layers on other printed circuit board layers. For example, as the right hand section of the conductive layer 900 on the first printed circuit board is not required for current flow between the W phase busbar pin and the first phase windings of the first sub motor, second sub motor and the third sub motor, this section of the conductive layer may be used to support current flow for other conductive layers. For the purposes of this embodiment, this section of the first conductive layer is electrically isolated from the rest of the first conductive layer and is used for support current flow in the sixth conductive layer on the fourth printed circuit board layer.

The invention claimed is:

1. A lead frame for electrically coupling a first inverter having a plurality of inverter legs to a first set of coil windings of an electric motor or generator that forms a first sub motor, the lead frame comprising:
   a printed circuit board having a plurality of circuit board layers, wherein each circuit board layer includes an insulating substrate having an electrically conductive layer formed on the insulating substrate;
   wherein a first circuit board layer includes a first electrically conductive layer arranged to be coupled to a first coil winding of the first set of coil windings and a first leg of the first inverter;
   wherein a second circuit board layer includes a second electrically conductive layer arranged to be coupled to a second coil winding of the first set of coil windings and a second leg of the first inverter;
   wherein a third circuit board layer includes a third electrically conductive layer arranged to be coupled to a third coil winding of the first set of coil windings and a third leg of the first inverter;
   wherein a fourth circuit board layer includes a fourth electrically conductive layer arranged to be coupled to the first coil winding, the second coil winding, and the third coil winding to form a neutral point between the first coil winding, the second coil winding, and the third coil winding;
   wherein the first circuit board layer includes a fifth electrically conductive layer arranged to be coupled to a first coil winding of a second set of coil windings that forms a second sub motor and a first leg of a second inverter;
   wherein the second circuit board layer includes a sixth electrically conductive layer arranged to be coupled to a second coil winding of the second set of coil windings and a second leg of the second inverter;
   wherein the third circuit board layer includes a seventh electrically conductive layer arranged to be coupled to a third coil winding of the second set of coil windings and a third leg of the second inverter; and
   wherein the fourth circuit board layer includes an eighth electrically conductive layer arranged to be coupled to the first coil winding, the second coil winding, and the third coil winding of the second set of coil windings to form a neutral point between the first coil winding, the second coil winding, and the third coil winding of the second set of coil windings.

2. The lead frame according to claim 1, wherein the printed circuit board includes a fifth circuit board layer having a plurality of electrically conductive layers arranged to electrically couple a first coil-sub set corresponding to the first coil winding, a second coil-sub sets corresponding to the second coil winding and a third coil-sub sets corresponding to the third coil winding of the first set of coil windings; and
   wherein each coil sub-set includes a plurality of coils and the plurality of electrically conductive layers on the fifth circuit board layer are arranged to allow the plurality of coils for each respective coil sub-set to be coupled with respect to each other such that each coil produces a magnetic field that is anti-parallel with its adjacent coil for a given direction of current flow while having a common phase.

3. The lead frame according to claim 1, wherein the printed circuit board is substantially circumferential.

4. The lead frame according to claim 1, wherein the first conductive region and the fifth conductive region are electrically isolated from each other and located on different regions of the first circuit board layer.

5. The lead frame according to claim 1, wherein the second conductive region and the sixth conductive region are electrically isolated from each other and located on different regions of the second circuit board layer.

6. The lead frame according to claim 1, wherein the third conductive region and the seventh conductive region are electrically isolated from each other and located on different regions of the third circuit board layer.

7. The lead frame according to claim 1, wherein the fourth conductive region and the eighth conductive region are electrically isolated from each other and located on different regions of the fourth circuit board layer.

8. The lead frame according to claim 1, wherein the printed circuit board further comprises a sixth circuit board layer having a ninth electrically conductive layer arranged to be coupled to the first coil winding of the first set of coil windings and the first leg of the first inverter, a seventh circuit board layer having a tenth electrically conductive layer arranged to be coupled to the second coil winding of the first set of coil windings and the second leg of the first inverter, an eighth circuit board layer having a eleventh electrically conductive layer arranged to be coupled to the third coil winding of the first set of coil windings and the third leg of the first inverter; a ninth circuit board layer having a twelfth electrically conductive layer arranged to be coupled to the first coil winding, the second coil winding, and the third coil winding to form a neutral point between the first coil winding, the second coil winding, and the third coil winding.

9. A lead frame according to claim 8
wherein the printed circuit board includes a fifth circuit board layer having a plurality of electrically conductive layers arranged to electrically couple a first coil-sub set corresponding to the first coil winding, a second coil-sub sets corresponding to the second coil winding and a third coil-sub sets corresponding to the third coil winding of the first set of coil windings; and
wherein each coil sub-set includes a plurality of coils and the plurality of electrically conductive layers on the fifth circuit board layer are arranged to allow the plurality of coils for each respective coil sub-set to be coupled with respect to each other such that each coil produces a magnetic field that is anti-parallel with its adjacent coil for a given direction of current flow while having a common phase; and
wherein the printed circuit board further comprises a tenth circuit board layer having a plurality of electrically conductive layers arranged to electrically couple the respective coils of each coil sub-set, wherein the plurality of electrically conductive layers on the tenth circuit board layer are arranged to allow the plurality of coils for each respective coil sub-set to be coupled with respect to each other such that each coil produces a magnetic field that is anti-parallel with its adjacent coil for a given direction of current flow while having a common phase.

10. The lead frame according to claim 1, wherein the printed circuit board includes means for locating the lead frame on a stator of an electric motor or generator in a predetermined location.

11. The lead frame according to claim 1, wherein the printed circuit board includes a plurality of recesses formed in the inner and outer edge of the printed circuit board, wherein each recess is arranged to receive a respective coil winding for electrically coupling the coil winding to the printed circuit board.

12. An electric motor or generator comprising:
a stator having a circumferential support including a plurality of teeth formed on the circumferential support; and
a lead frame according to claim 1;
wherein coil windings are mounted on the plurality of teeth and the lead frame is mounted on the circumferential support, wherein the coil windings are coupled to the lead frame to form a star connection.

13. The electric motor or generator according to claim 12, wherein the lead frame is mounted on the circumferential support adjacent to the coil windings.

* * * * *